(12) United States Patent
Klein et al.

(10) Patent No.: US 10,438,416 B1
(45) Date of Patent: Oct. 8, 2019

(54) REAL-TIME COMPOSITING IN MIXED REALITY

(71) Applicant: Microsoft Technology Licensing, LLC, Redmond, WA (US)

(72) Inventors: Andrew Klein, Vancouver (CA); Cedric Caillaud, Burnaby (CA); Jeremy Kersey, Vancouver (CA); Cedric Lee, Vancouver (CA); William Ben Hanke, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/004,250

(22) Filed: Jun. 8, 2018

(51) Int. Cl.
*G06T 15/50* (2011.01)
*G06T 15/55* (2011.01)
*G06T 15/80* (2011.01)
*G06T 19/00* (2011.01)

(52) U.S. Cl.
CPC ............ *G06T 19/006* (2013.01); *G06T 15/50* (2013.01); *G06T 15/506* (2013.01); *G06T 15/55* (2013.01); *G06T 15/80* (2013.01)

(58) Field of Classification Search
CPC .................. G06T 15/50; G06T 19/006; G06T 2207/10152; G06T 15/506
See application file for complete search history.

(56) References Cited

U.S. PATENT DOCUMENTS 8,797,321 B1 8/2014 Bertolami et al.
9,466,149 B2 10/2016 Jones et al.
2015/0279113 A1* 10/2015 Knorr .................. G06T 19/006
345/633
2016/0231573 A1 8/2016 Mullins et al.
2016/0323560 A1 11/2016 Jin et al.

FOREIGN PATENT DOCUMENTS

WO 2013167901 A1 11/2013

OTHER PUBLICATIONS

Peter Supan, "Interactive Image Based Lighting in Augmented Reality", Central European Seminar on Computer Graphics, 2006, 8 pages (Year: 2006).*
X. Chen, et. al, "Lighting virtual objects in a single image via coarse scene understanding", Science China Information Sciences, Sep. 2014, vol. 57, No. 9, 14 pages (Year: 2014).*

(Continued)

*Primary Examiner* — Jin Cheng Wang
(74) *Attorney, Agent, or Firm* — Holzer Patel Drennan

(57) ABSTRACT

A system may include a memory device to store instructions and data, and at least one processing device to execute the instructions stored in the memory device to: receive a background image and a digital object to be composited onto the background image in a mixed reality view, generate a 2D bounding region for the digital object, select a version of the background image at a pre-defined resolution, overlay the 2D bounding region on the selected version of the background image and obtain a set of samples of the colors of pixels of the selected version along a perimeter of the 2D bounding region, and determine a value for one or more digital lighting sources to illuminate the digital object in the mixed reality view, based, at least in part, on the set of samples.

20 Claims, 29 Drawing Sheets
(18 of 29 Drawing Sheet(s) Filed in Color)

(56) References Cited

OTHER PUBLICATIONS

Karsch, et al., "Automatic Scene Inference for 3D Object Compositing", In Journal of ACM Transactions on Graphics, vol. 28, No. 4, Aug. 2009, pp. 1-14.
Kronander, et al., "Photorealistic rendering of mixed reality scenes", In Journal of Computer Graphics Forum, vol. 34, Issue 2, May 2015, 23 Pages.
Mandl, et al., "Learning Lightprobes for Mixed Reality Illumination", In Proceedings of IEEE International Symposium on Mixed and Augmented Reality, Oct. 9, 2017, 8 Pages.

* cited by examiner

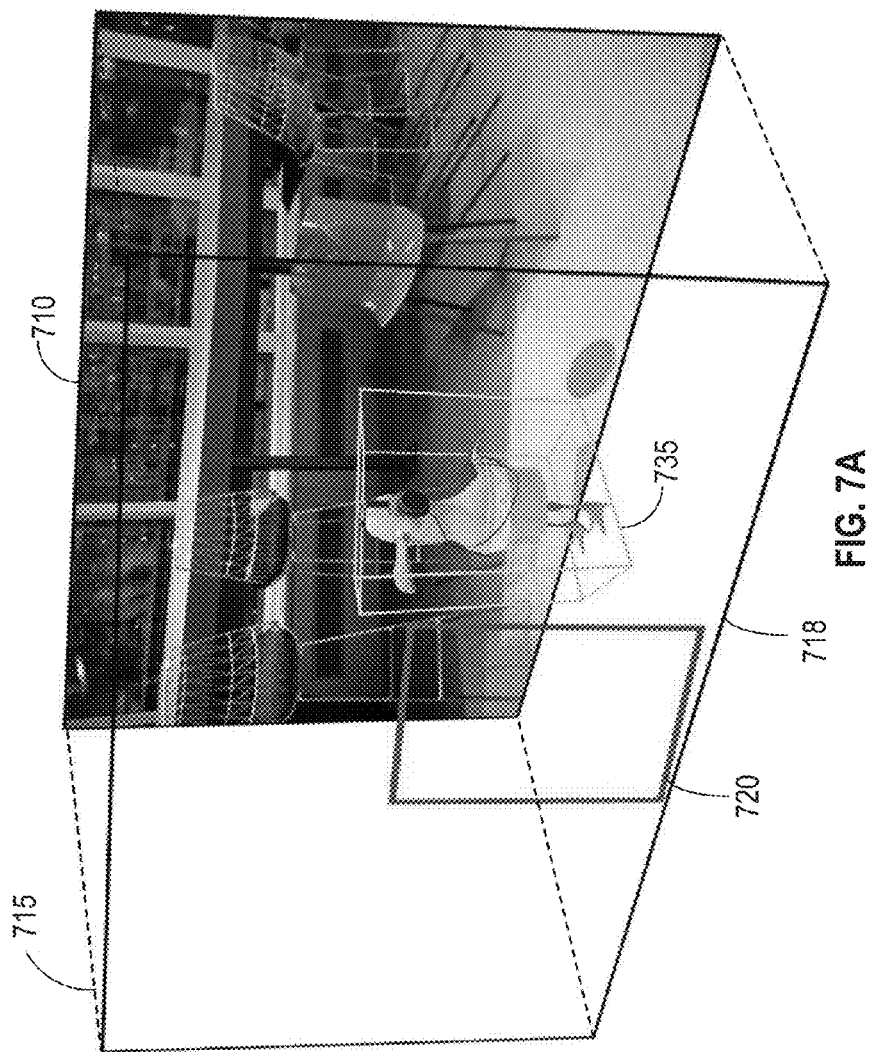
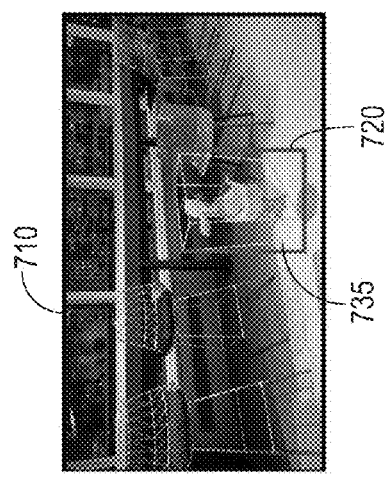

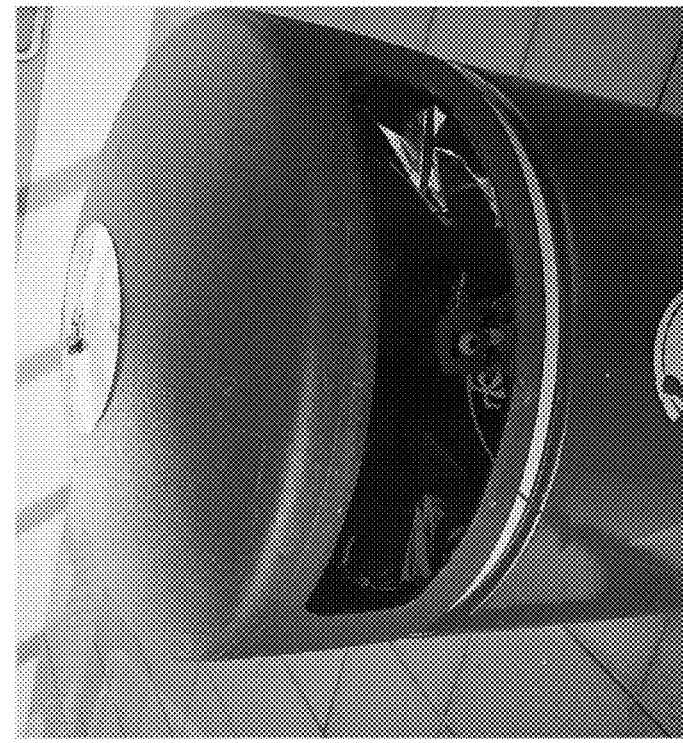
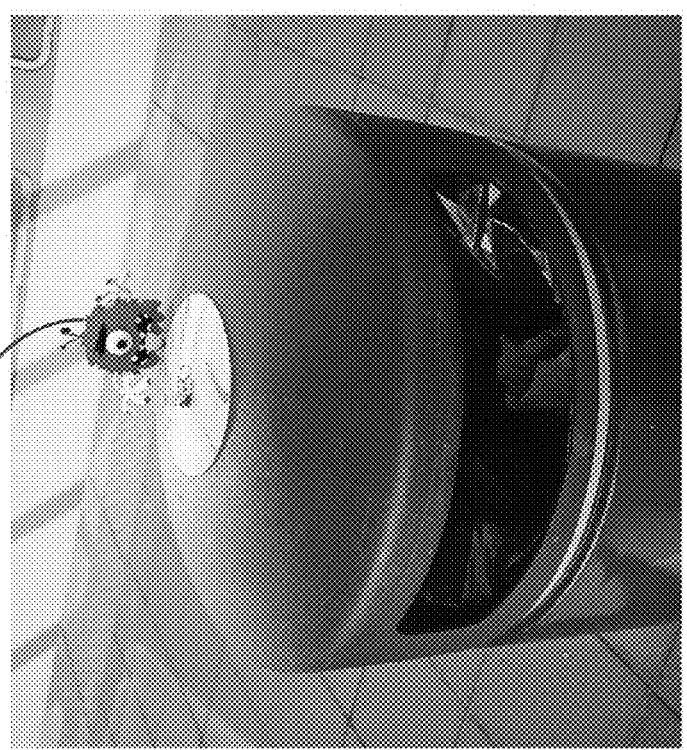

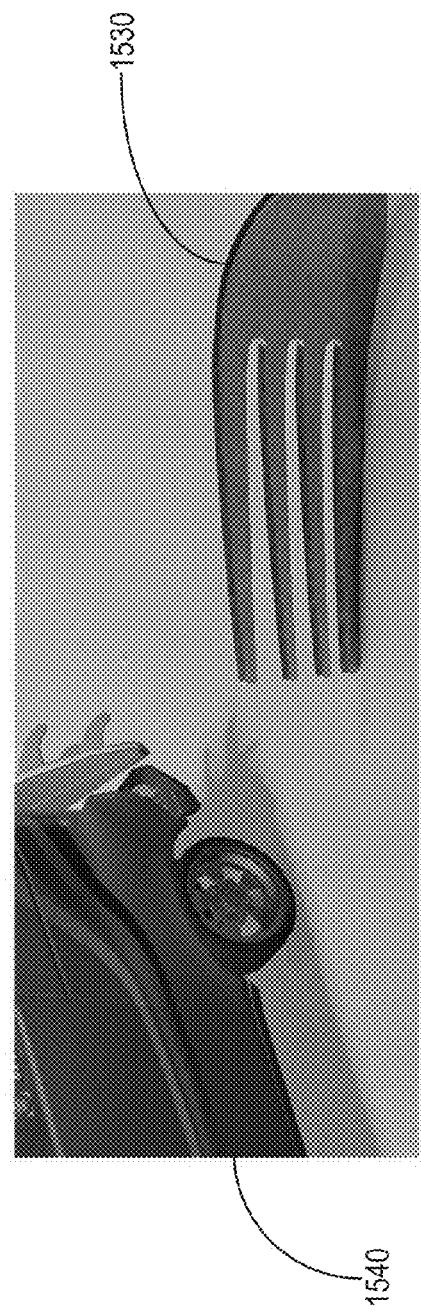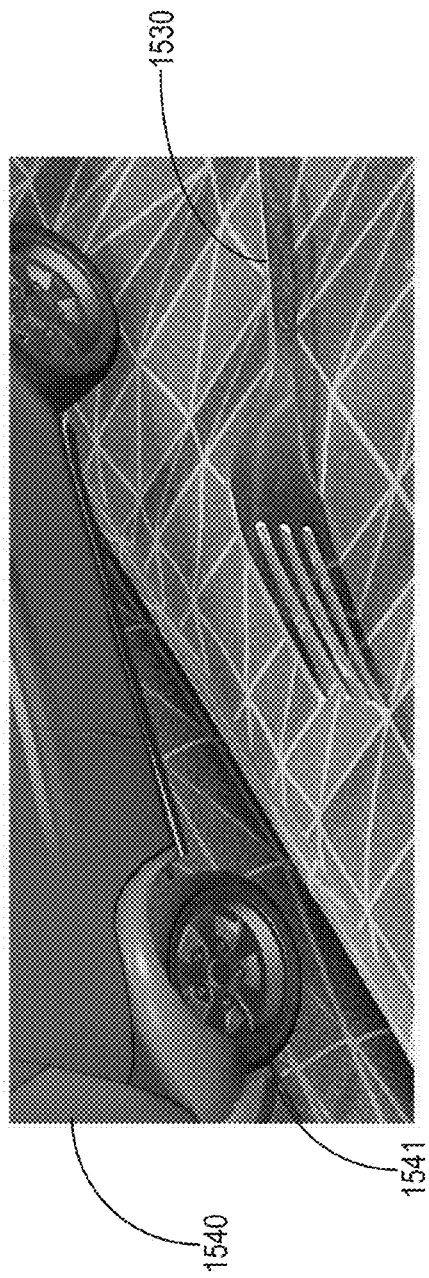

US 10,438,416 B1

REAL-TIME COMPOSITING IN MIXED REALITY

TECHNICAL FIELD

The present disclosure relates to image processing and, more particularly, to real-time compositing of visual elements and background images in a mixed reality viewer.

BACKGROUND

When integrating 3D objects with real world images in mixed reality, the objects may generally be perceived to be an overlay, and not part of the real world depicted in the images. Thus, the 3D objects often appear unlit or static, which breaks the illusion that the object is part of the real world environment.

SUMMARY

The present disclosure describes a system and method to dynamically composite a digital object onto a background image. An exemplary system may comprise a memory device to store instructions and data, and at least one processing device to execute the instructions stored in the memory device to receive a background image and a digital object, the digital object to be composited onto the background image in a mixed reality view. The at least one processing device may further generate a 2D bounding region for the digital object, select a version of the background image at a pre-defined resolution, and overlay the 2D bounding region on the selected version and obtain a set of samples of the colors of pixels of the selected version along a perimeter of the 2D bounding region. The at least one processing device may further determine a value for one or more digital lighting sources to illuminate the digital object in the mixed reality view, based, at least in part, on the set of samples.

An exemplary method may comprise receiving a background image and a digital object to be composited onto the background image in a mixed reality view, generating a 2D bounding region for the digital object, selecting a version of the background image at a pre-defined resolution, overlaying the 2D bounding region on the selected version of the background image and obtaining a set of samples of the colors of pixels of the selected version along a perimeter of the 2D bounding region, and determining a value for one or more digital lighting sources to illuminate the digital object in the mixed reality view, based, at least in part, on the set of samples.

An exemplary computer-readable storage medium may comprise instructions that, when executed by one or more processing devices, cause the one or more processing devices to receive a background image and a digital object, the digital object to be composited onto the background image in a mixed reality view. The instructions, when executed may further cause the one or more processing devices to generate a 2D bounding region for the digital object, select a version of the background image at a pre-defined resolution, and overlay the 2D bounding region on the selected version and obtain a set of samples of the colors of pixels of the selected version along a perimeter of the 2D bounding region. The instructions, when executed may further cause the one or more processing devices to determine a value for one or more digital lighting sources to illuminate the digital object in the mixed reality view, based, at least in part, on the set of samples.

BRIEF DRAWINGS DESCRIPTION

The patent or application file contains at least one drawing executed in color. Copies of this patent or patent application publication with color drawing(s) will be provided by the Office upon request and payment of the necessary fee.

The present disclosure describes various embodiments that may be understood and fully appreciated in conjunction with the following drawings:

FIG. 1 schematically illustrates an example system, in accordance with various embodiments.

FIG. 4A further illustrates a perspective of a camera of an example mixed reality viewer, and FIG. 4B illustrates a composited view of an example 3D object with an example video frame captured by the camera, in accordance with various embodiments.

Figure 5:
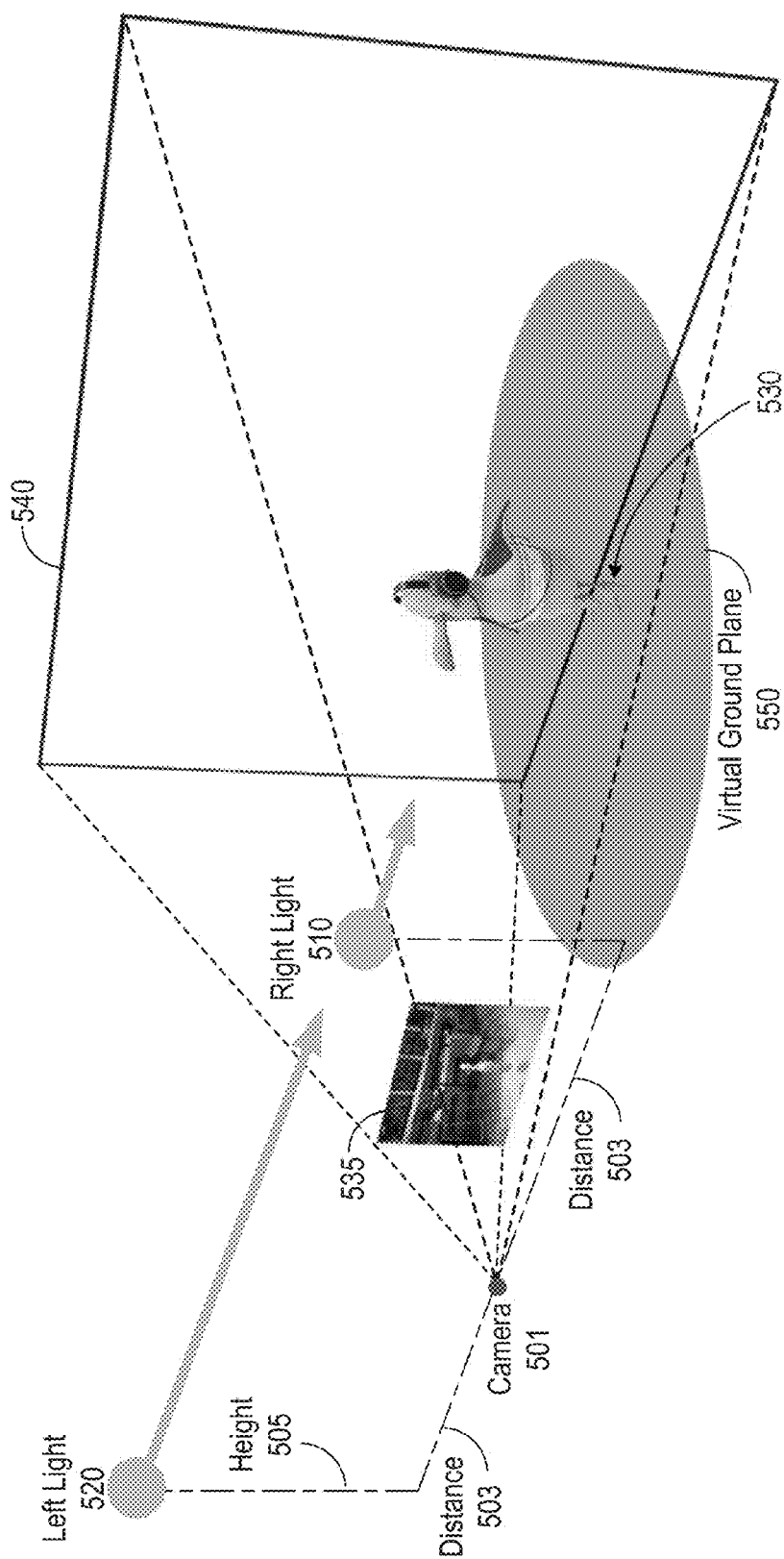

FIG. 5 illustrates an example light rig for an object to be composited in a mixed reality view, in accordance with various embodiments.

Figure 6A:
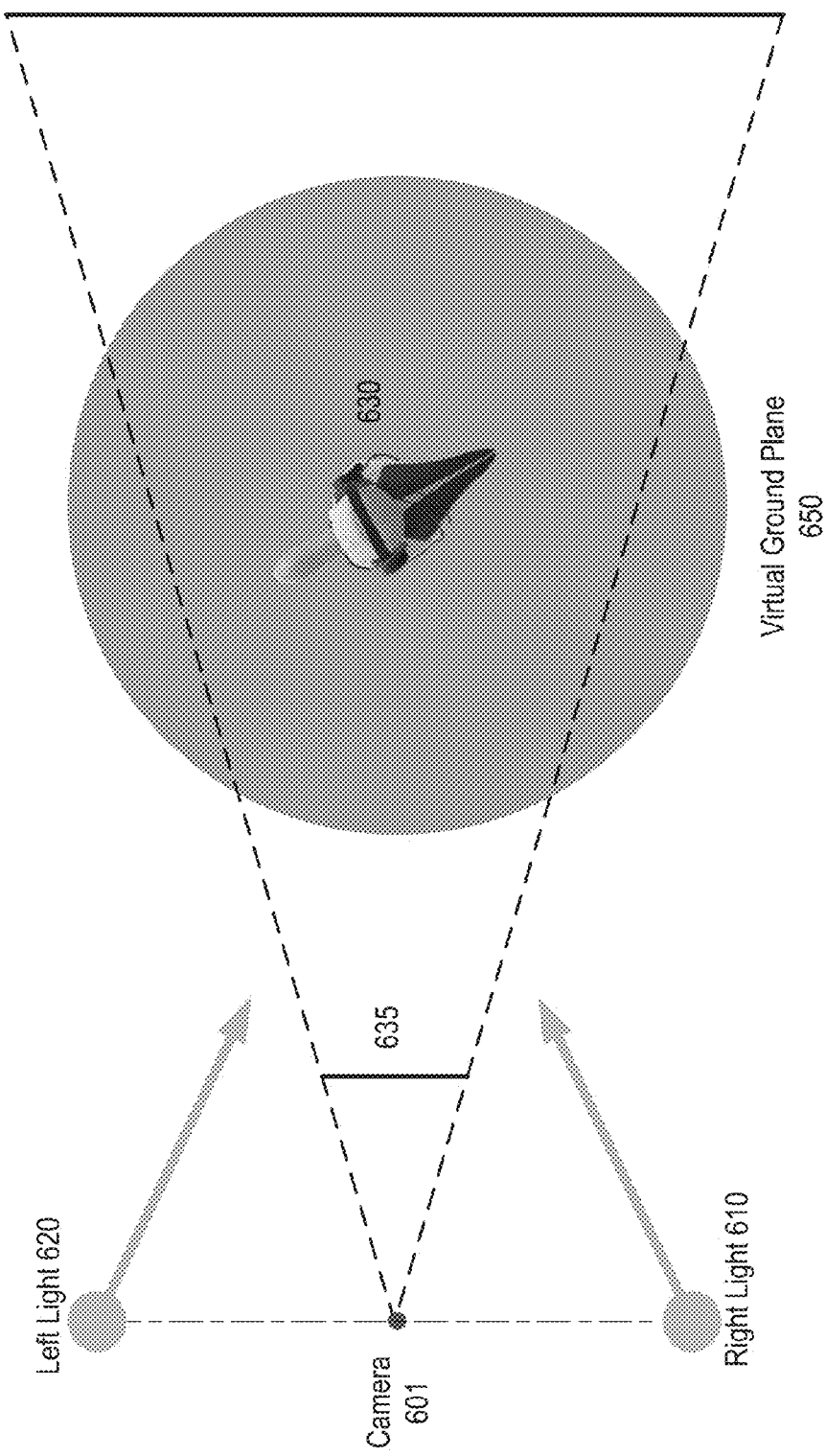

FIG. 6A illustrates the light rig and 3D space in which the 3D object is placed, as illustrated in FIG. 5, from an overhead, or "bird's eye view" viewpoint.

Figure 6B:
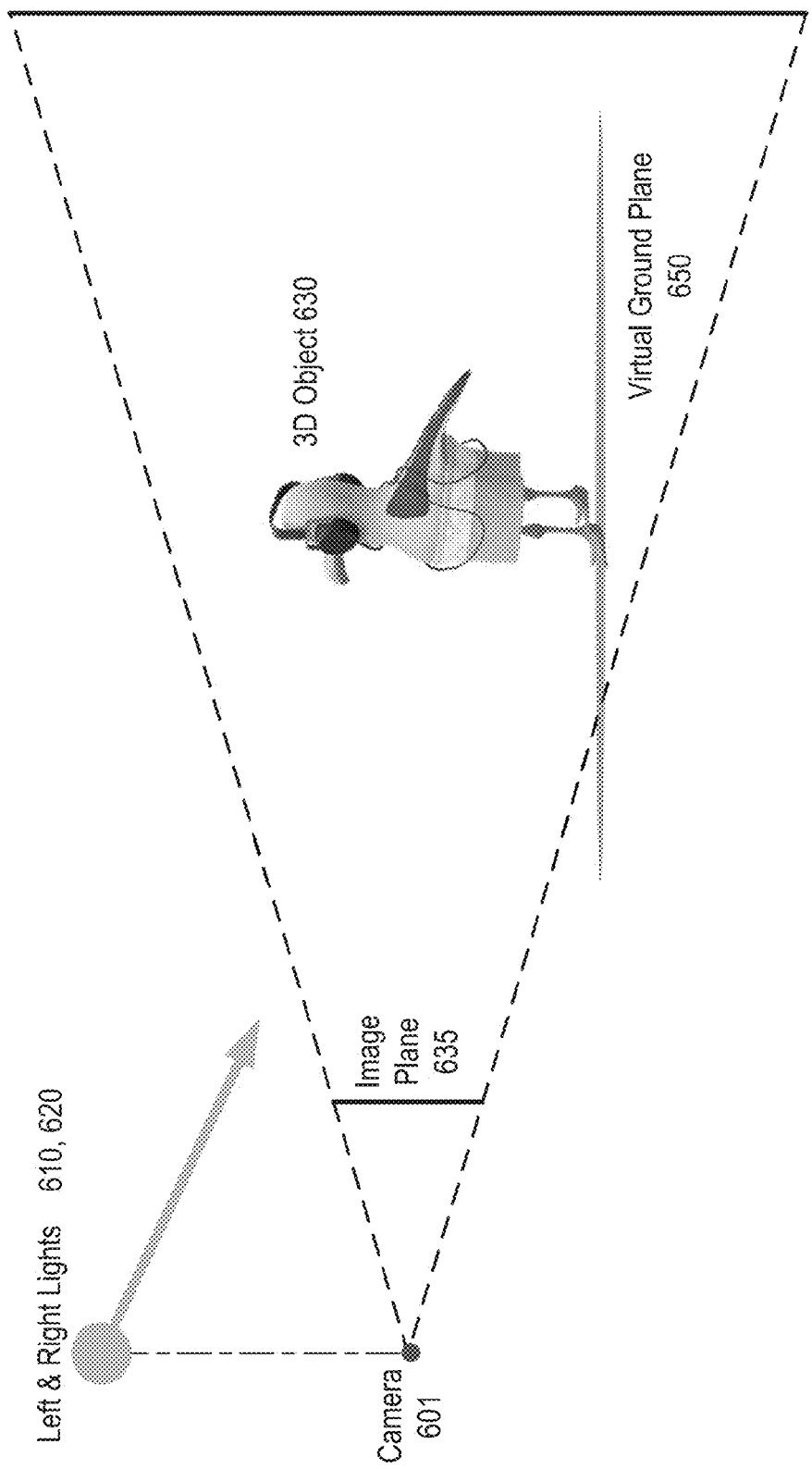

FIG. 6B is a side view of the 3D space of FIG. 6A.

FIG. 7A illustrates a perspective view of, and FIG. 7B illustrates a frontal view of, local lighting of an example 3D object, in accordance with various embodiments.

Figure 8:
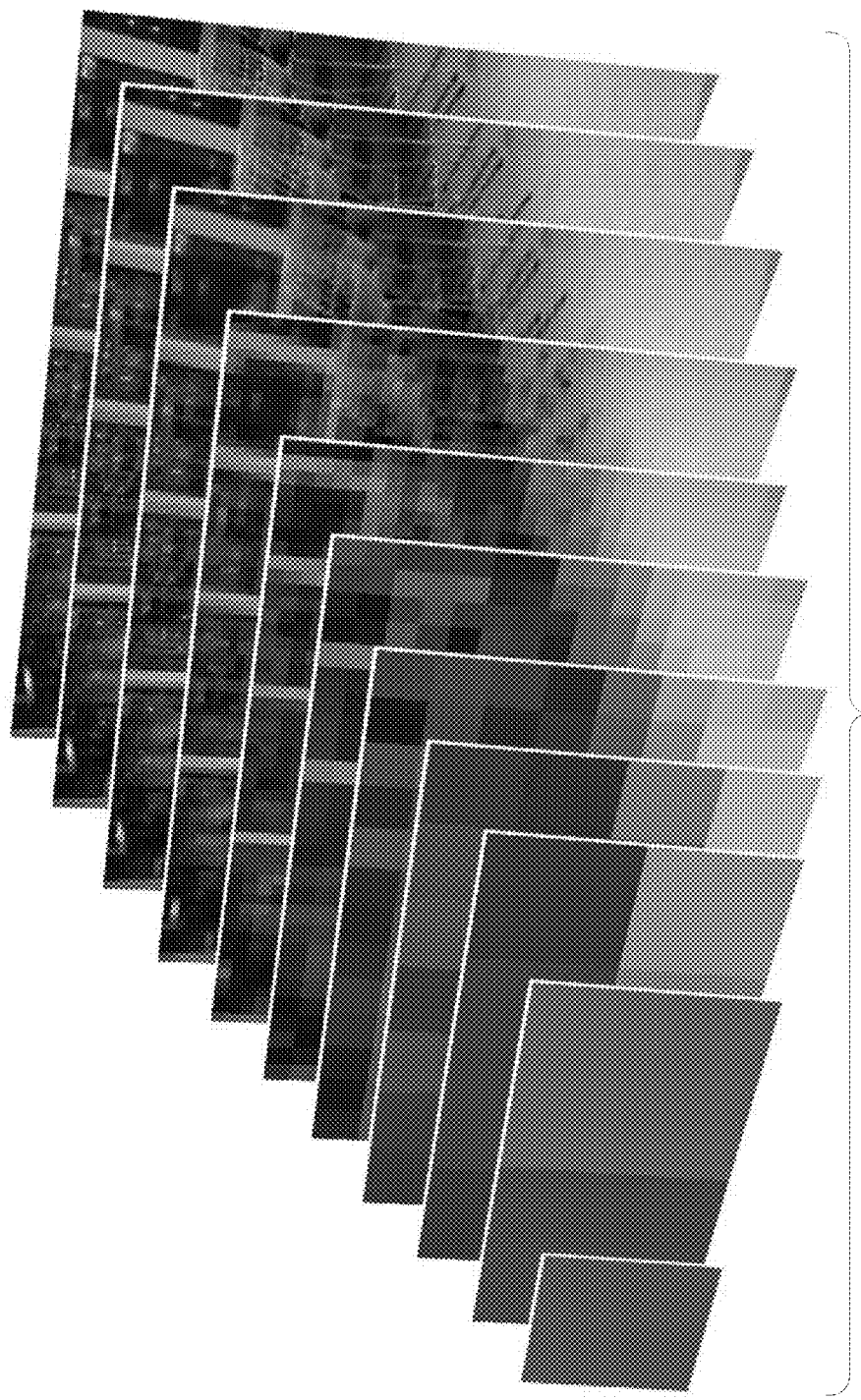

FIG. 8 illustrates the creation of a set of mipmaps from the example background image of FIGS. 7A and 7B, in accordance with various embodiments.

Figure 9:
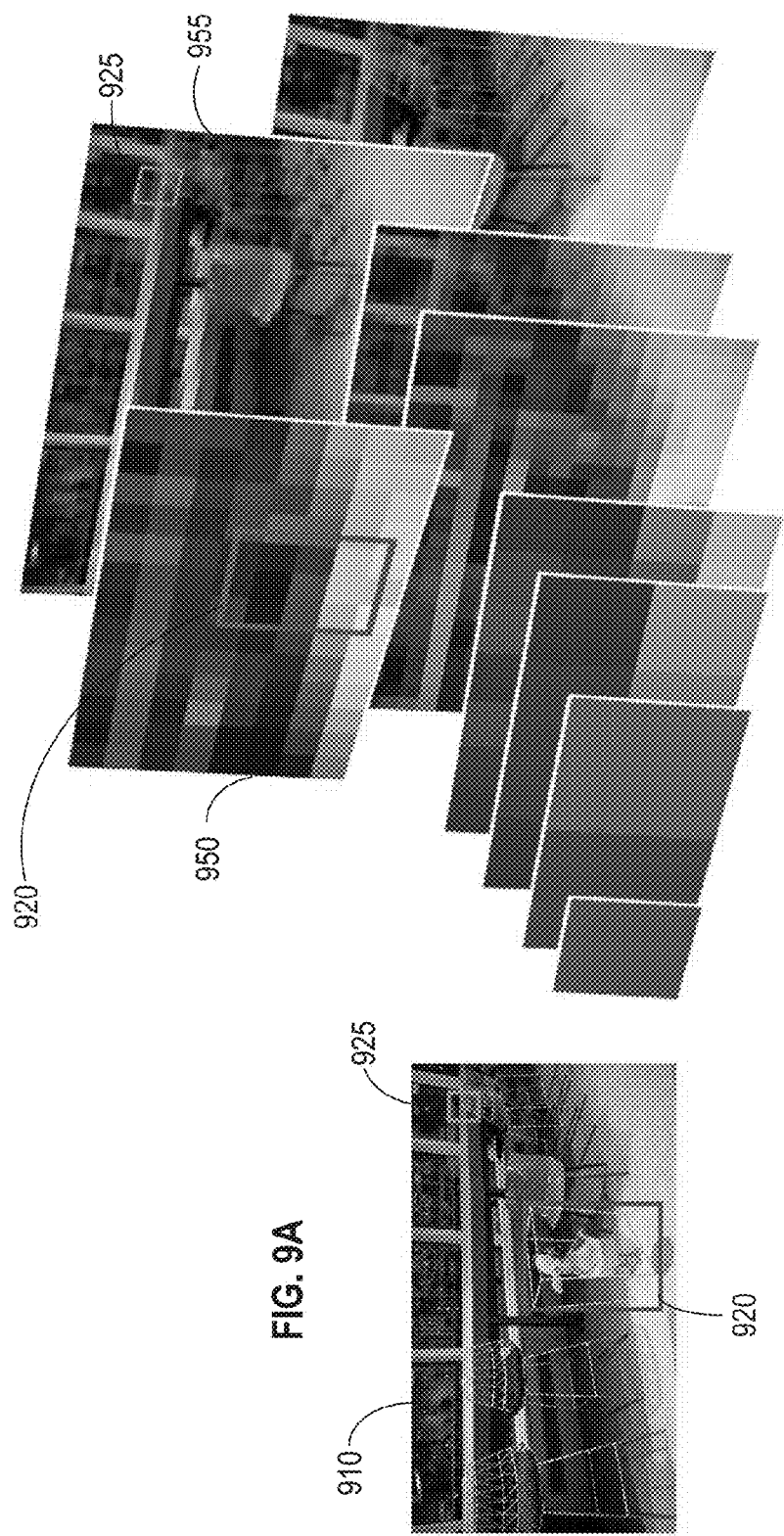

FIG. 9A illustrates selection of a mipmap from a set of mipmaps to locally light each 3D object in a mixed reality view, in accordance with various embodiments.

FIG. 9B is a front view of the two 3D objects of FIG. 9A in a mixed reality view with a video frame.

Figure 10:
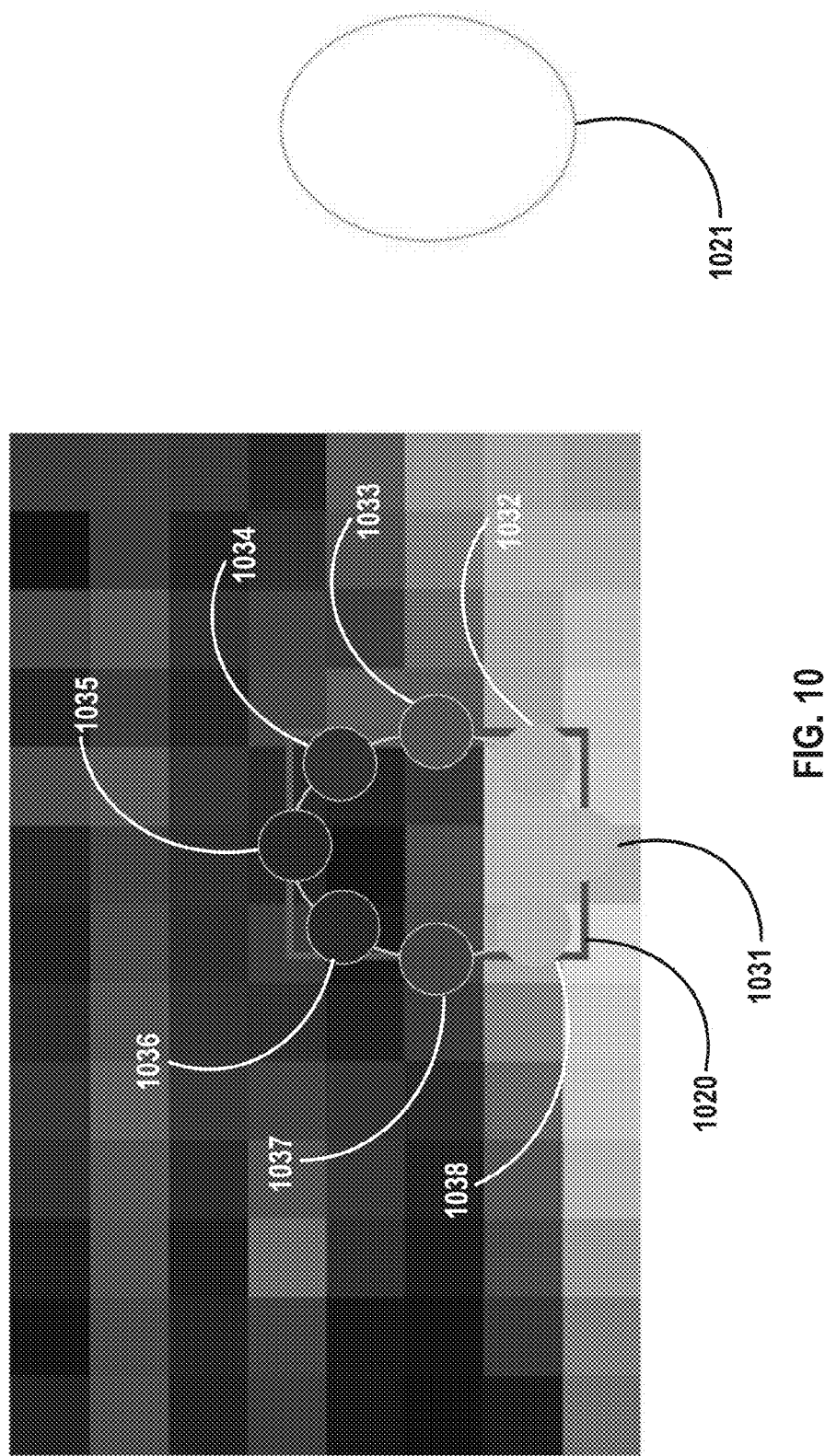

FIG. 10 illustrates an example sampling process for a revised 2D bounding box for an example object, in accordance with various embodiments.

Figure 11A:
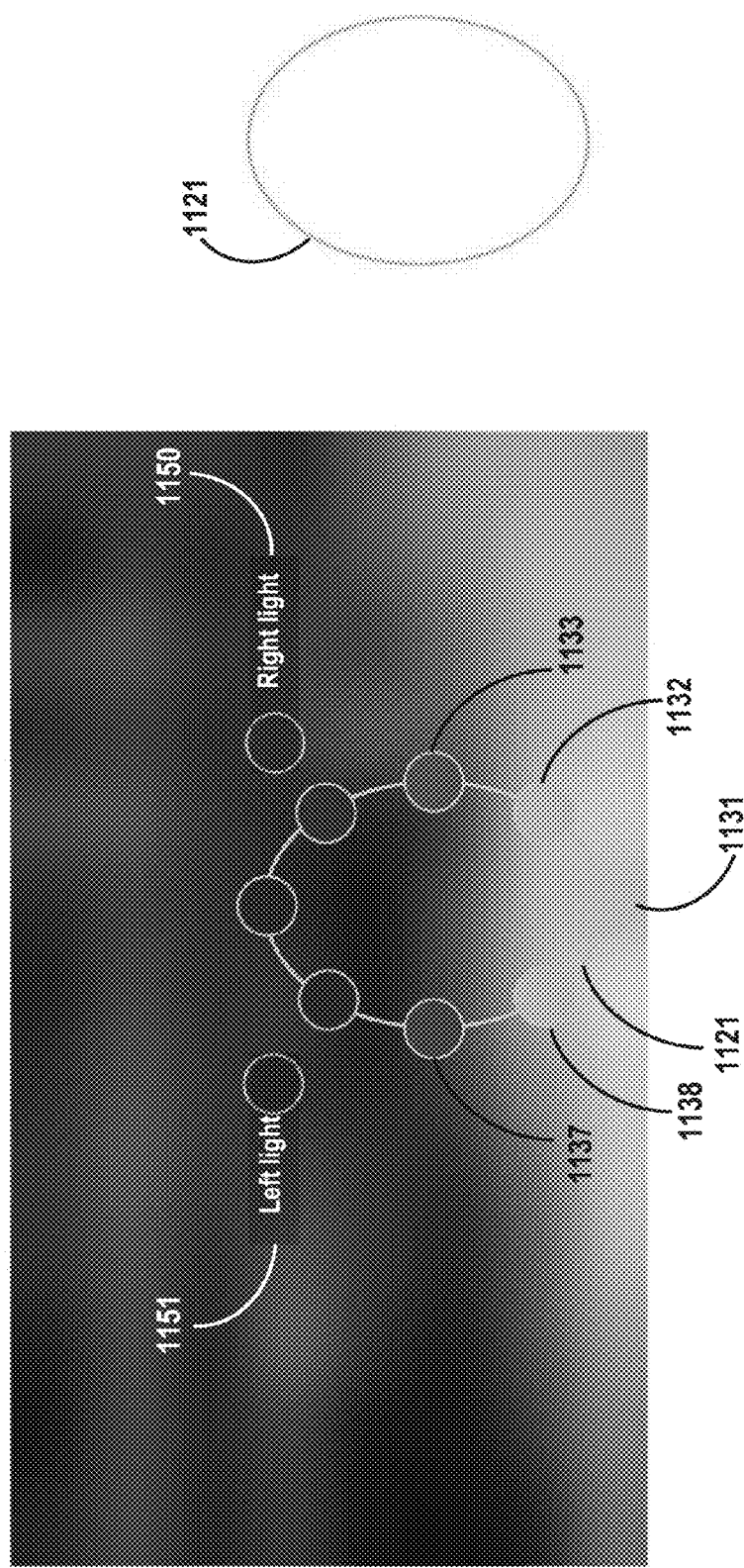

FIG. 11A illustrates combining samples using different weightings to obtain a color value for each of two digital lights, in accordance with various embodiments.

Figure 11B:
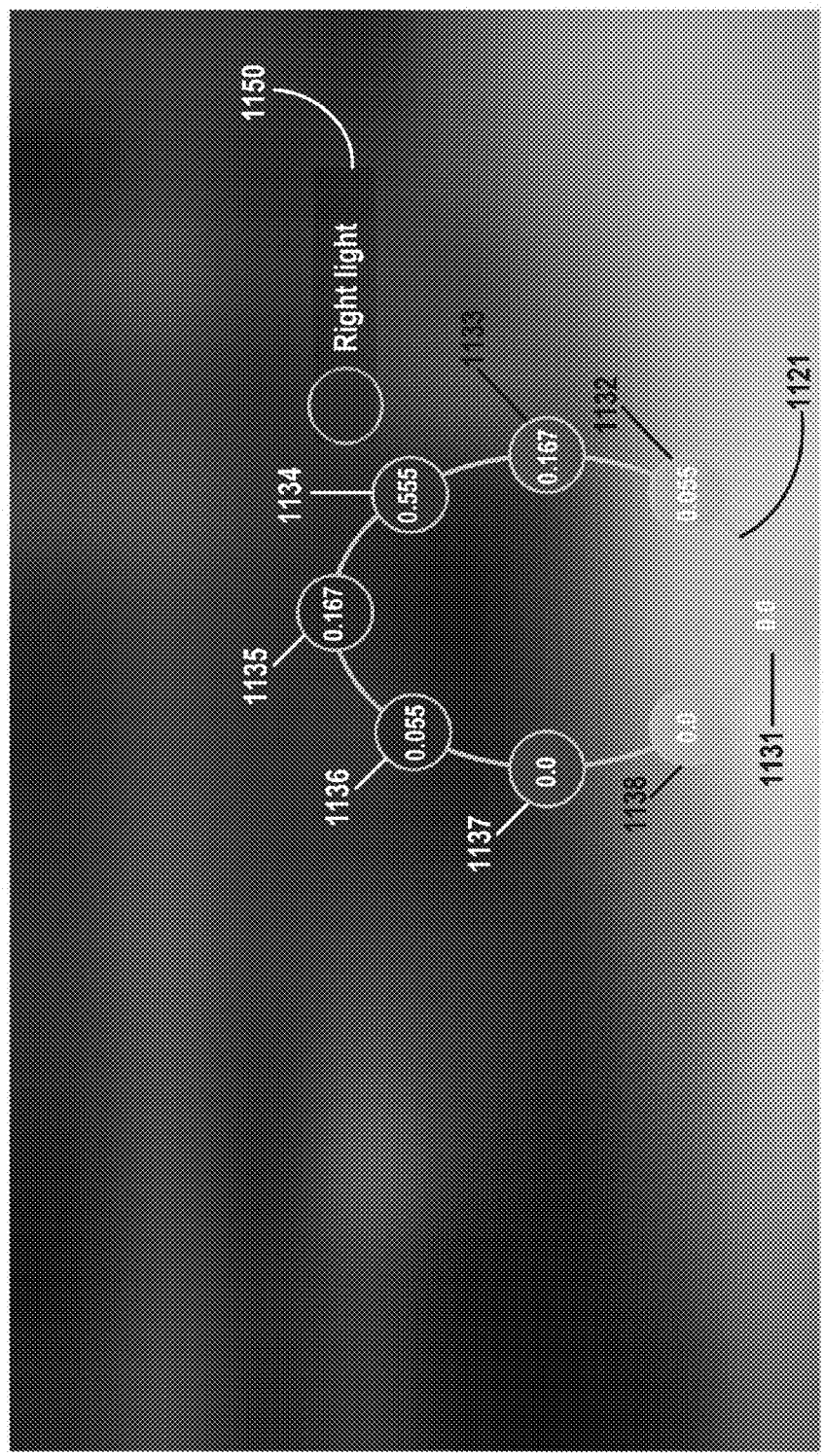

FIG. 11B illustrates example weightings for use in calculating a right light, from the samples of FIG. 11A.

Figure 11C:
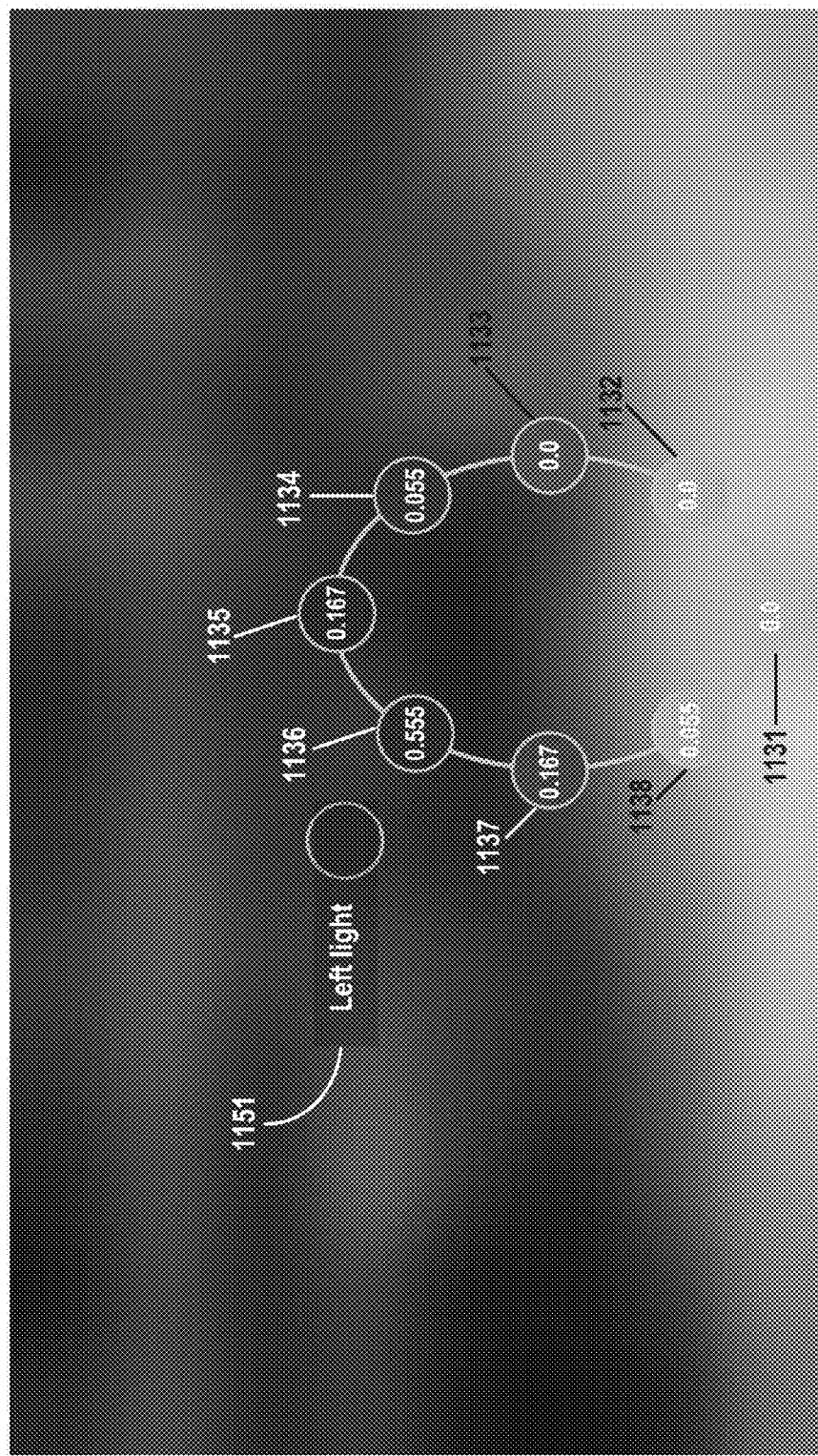

FIG. 11C illustrates example weightings for use in calculating a left light, from the samples of FIG. 11A.

Figure 12B:
Figure 12A:

FIGS. 12A and 12B illustrate lighting of an example 3D object composited with a background image, as a function of light intensity in the background image, in accordance with various embodiments.

FIGS. 13A and 13B illustrate another example lighting of an example 3D object composited with a background image, as a function of light intensity in the background image, in accordance with various embodiments.

Figure 14A:
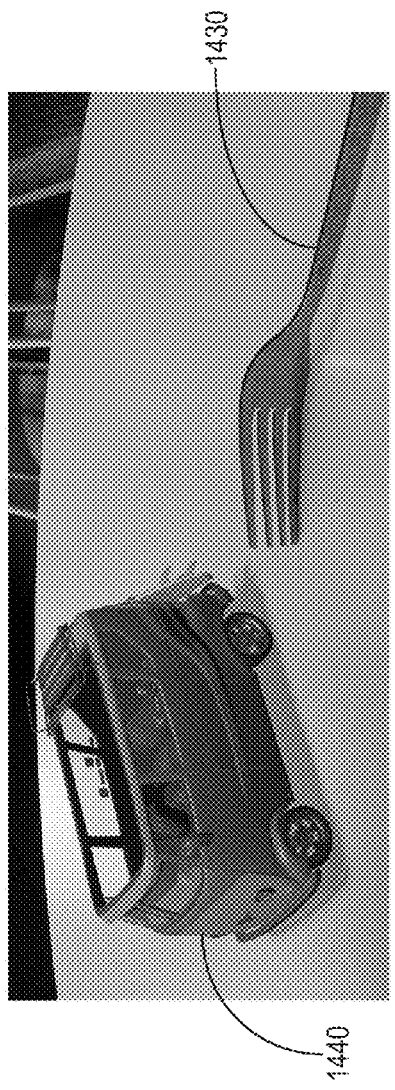
Figure 14B:
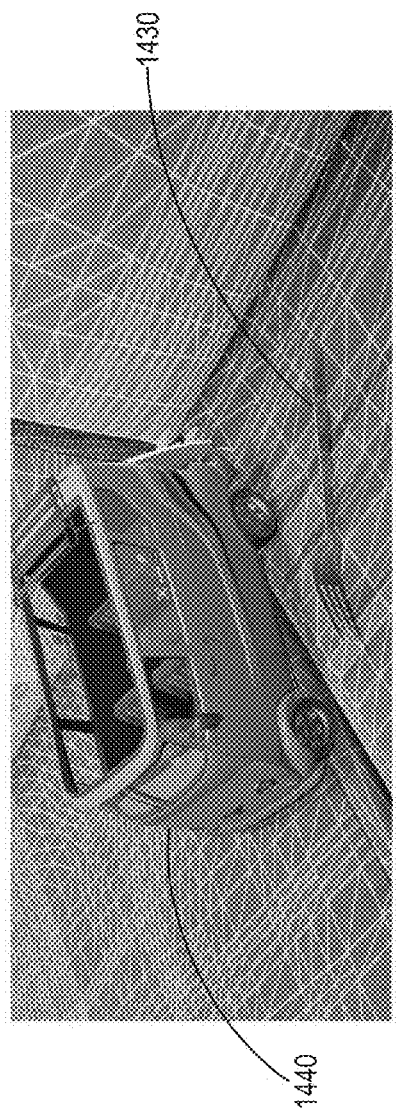

FIGS. 14A and 14B respectively illustrate a generic reflection map, and the use of an ambient color value to tint reflection and adjust intensity, according to various embodiments.

FIGS. 15A and 15B are magnified views of the tines of the example fork, and the tires of the example vehicle, of FIGS. 14A and 14B.

Figure 16B:
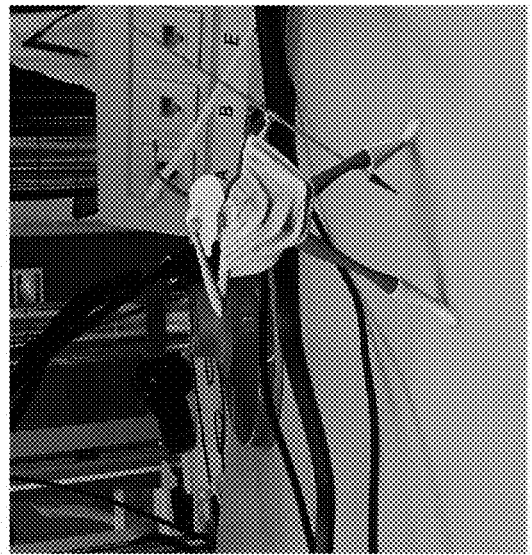
Figure 16A:
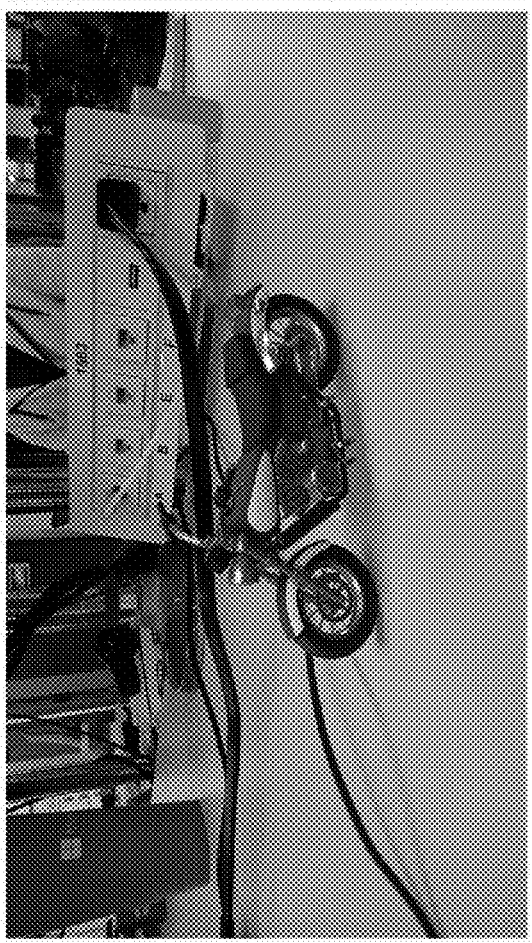

FIGS. 16A and 16B illustrate soft shadow effects, in accordance with various embodiments.

Figure 17:
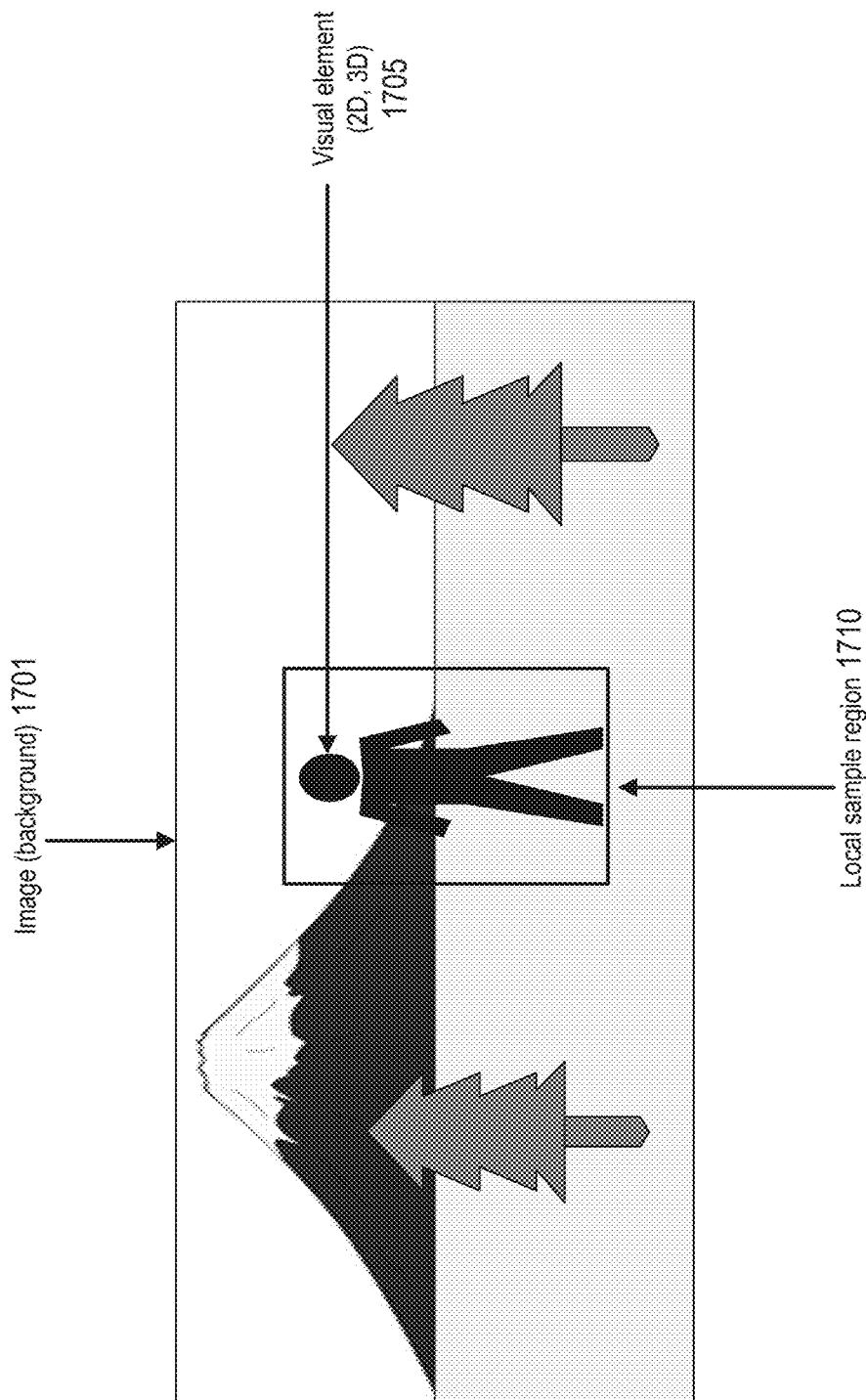

FIG. 17 schematically illustrates compositing of a visual element and a background image, in accordance with various embodiments.

Figure 18:
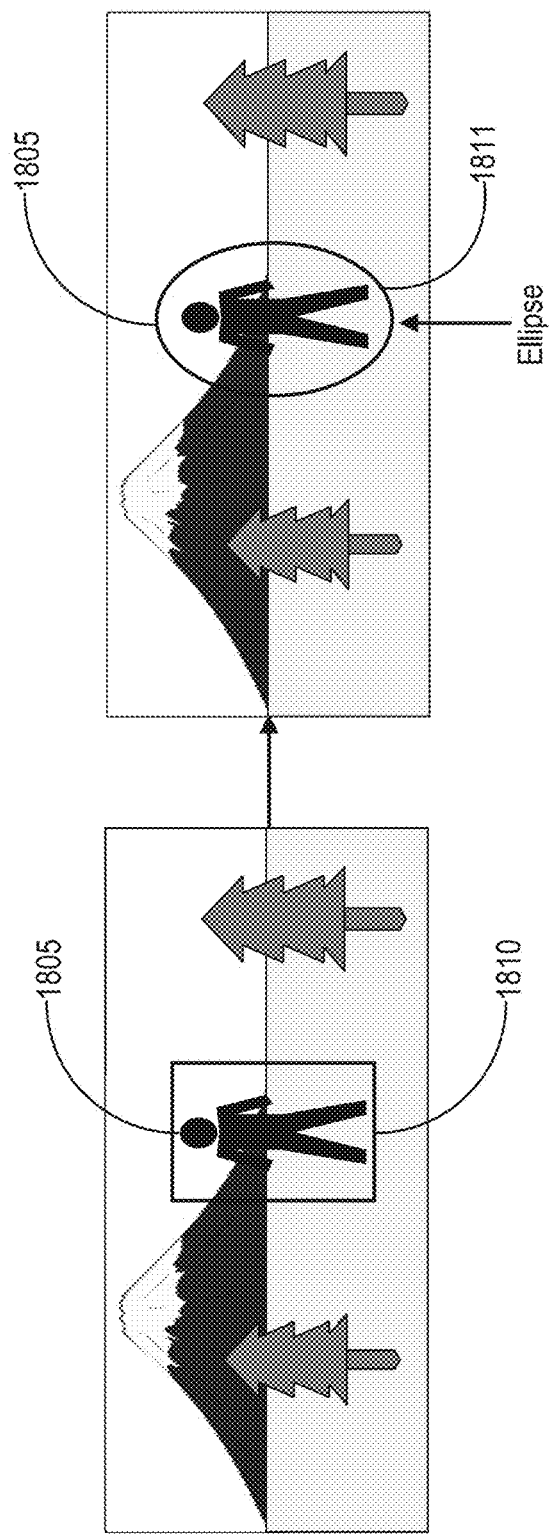

FIG. 18 illustrates elliptical conversion of a 2D bounding box in the schematic example of FIG. 17.

Figure 19:
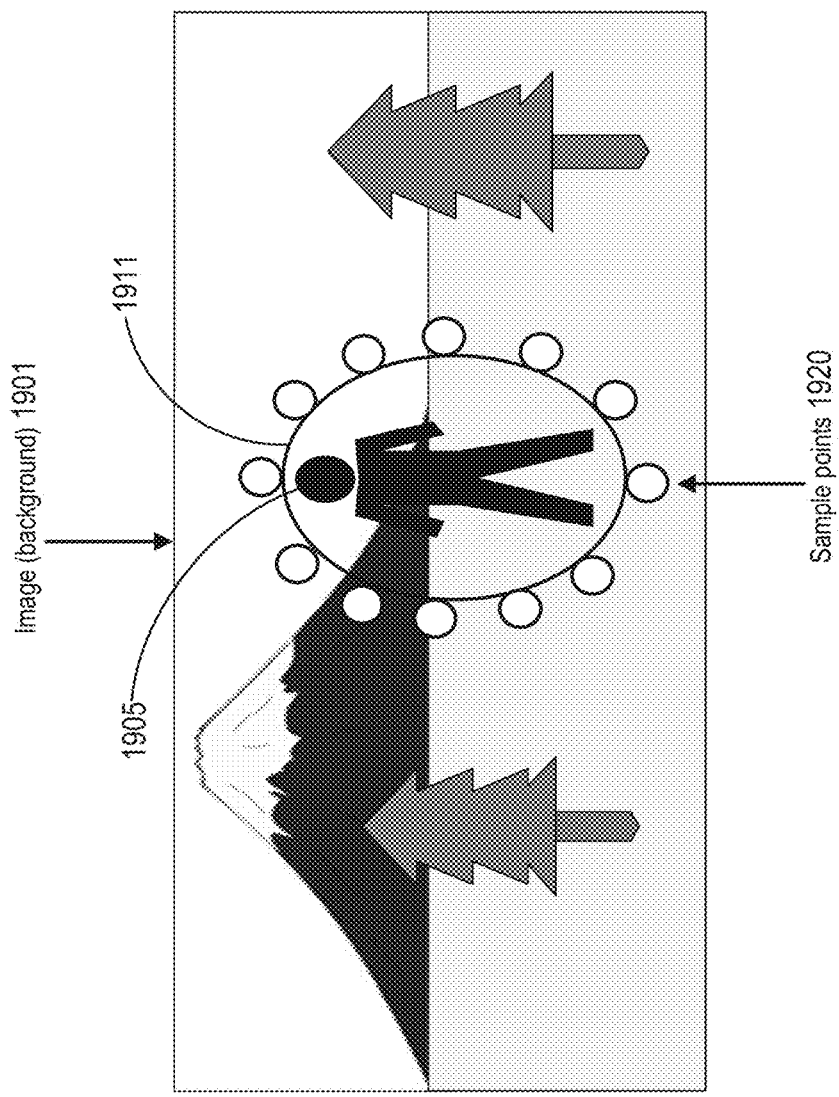

FIG. 19 illustrates sampling at various points along the bounding ellipse generated in the example of FIG. 18.

Figure 20:
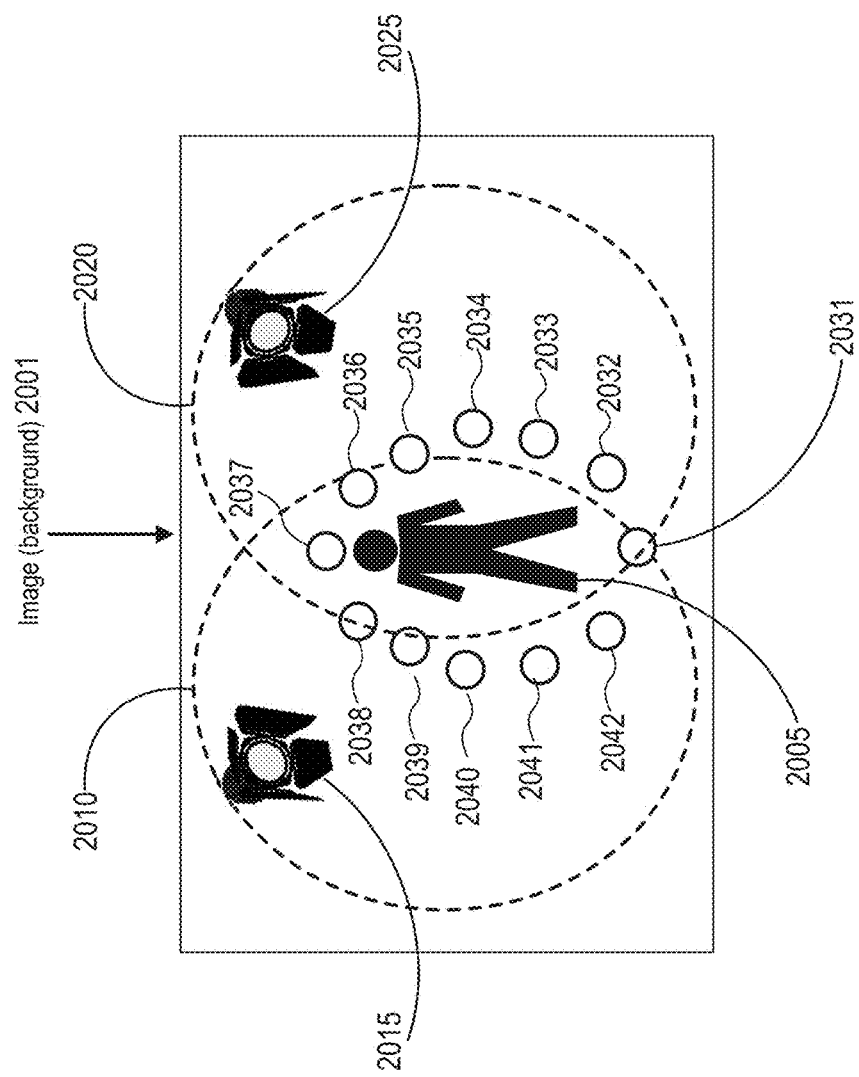

FIG. 20 illustrates combining the samples illustrated in FIG. 19 using different weightings to generate digital light values for each of an example digital left light and an example digital right light.

Figure 21:
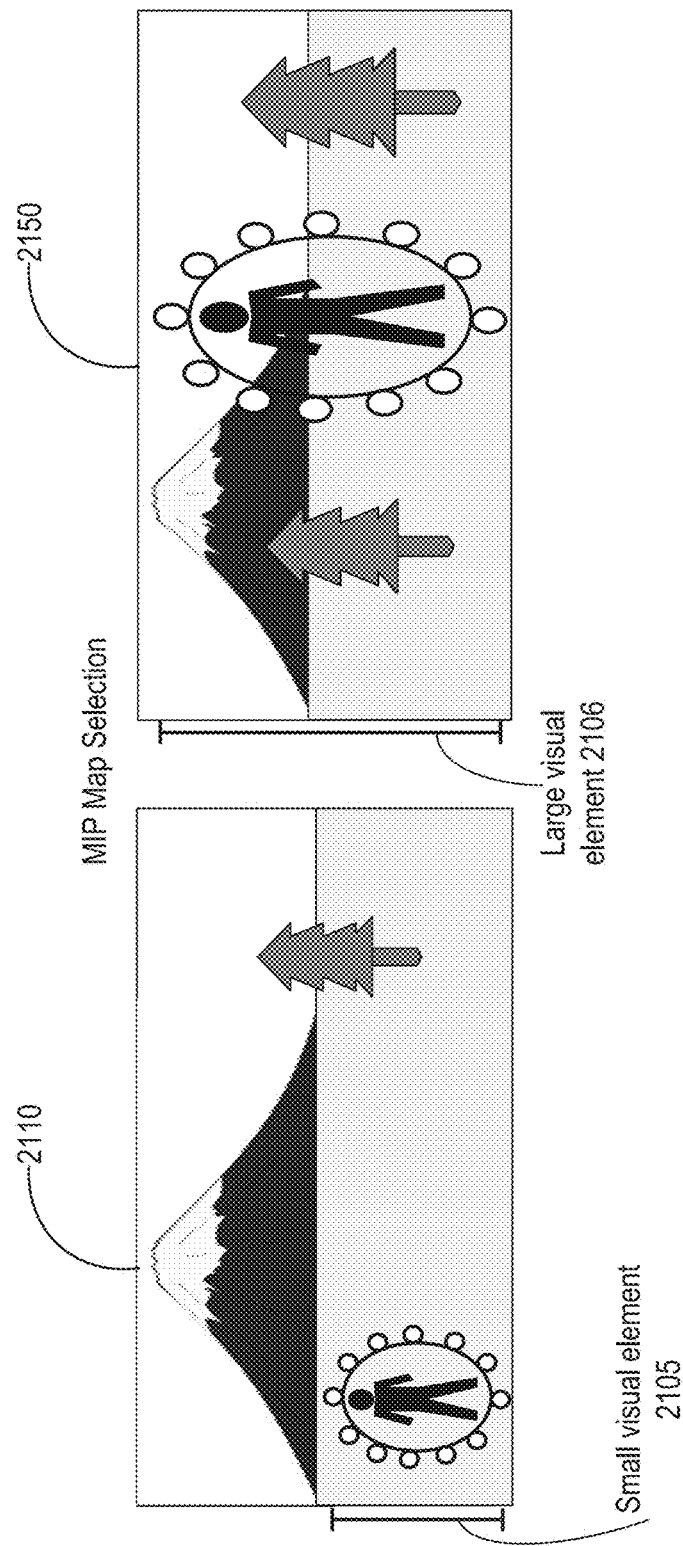

FIG. 21 illustrates mipmap selection as a function of the size of an example visual element, in accordance with various embodiments.

Figure 22:
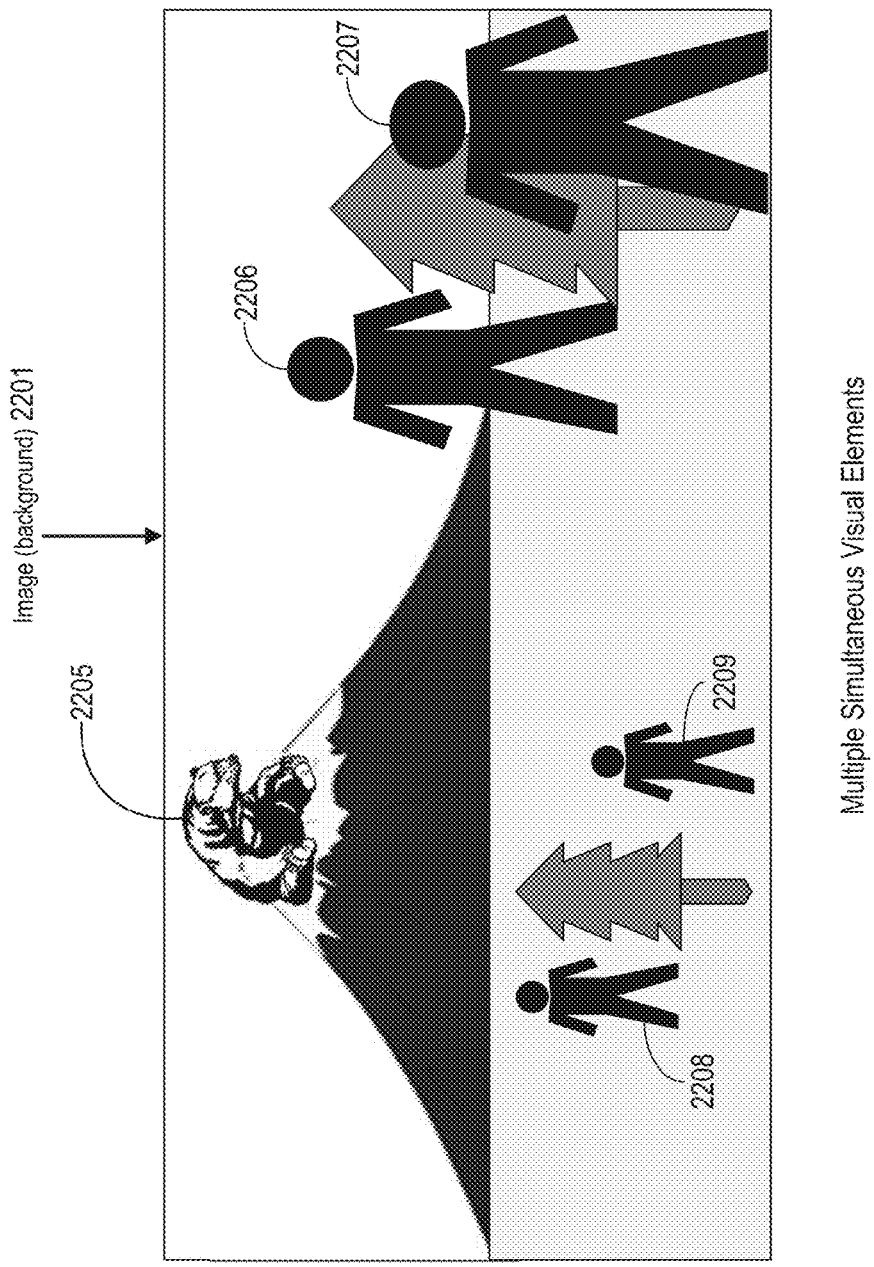

FIG. 22 illustrates simultaneously compositing multiple visual elements, of various sizes and locations within the viewpoint, in accordance with various embodiments.

Figure 23:
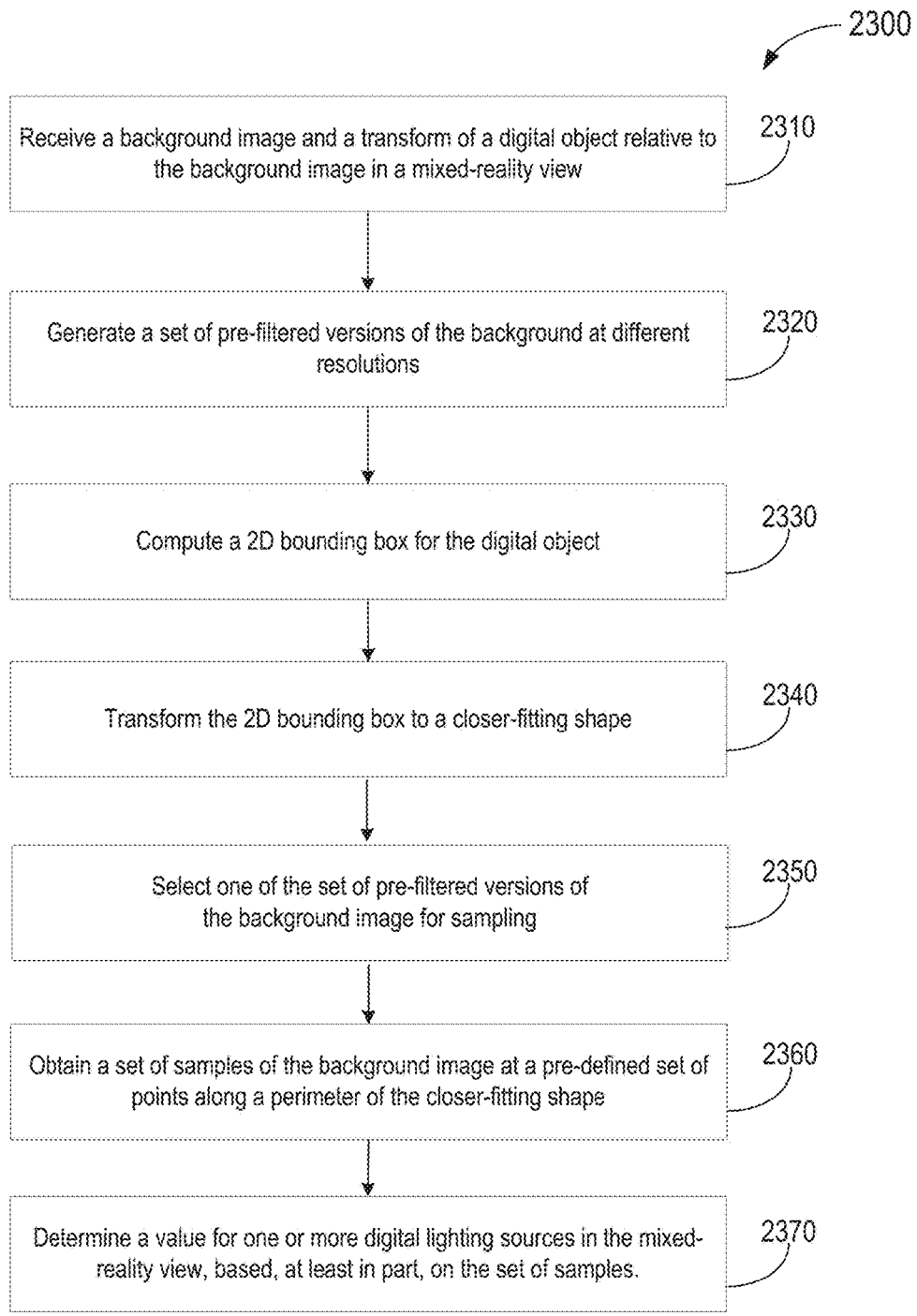
Figure 24:
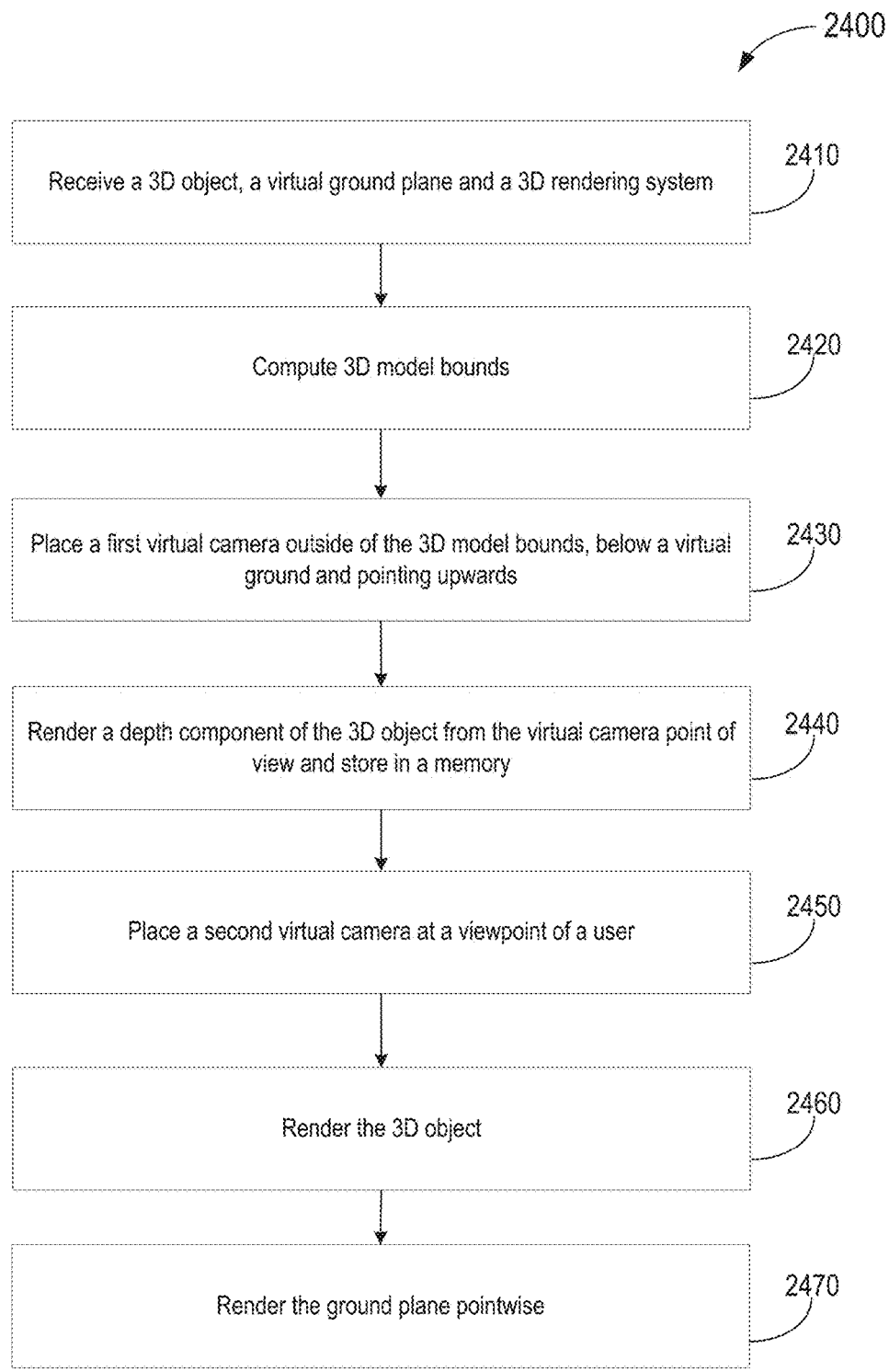

FIG. 23 illustrates an overview of the operational flow of a process to compute light colors using sampled colors using a normalized weighted average technique, in accordance with various embodiments, FIG. 24 illustrates an overview of the operational flow of a process for rendering a 3D object in a mixed reality view with shadows, in accordance with various embodiments.

Figure 25:
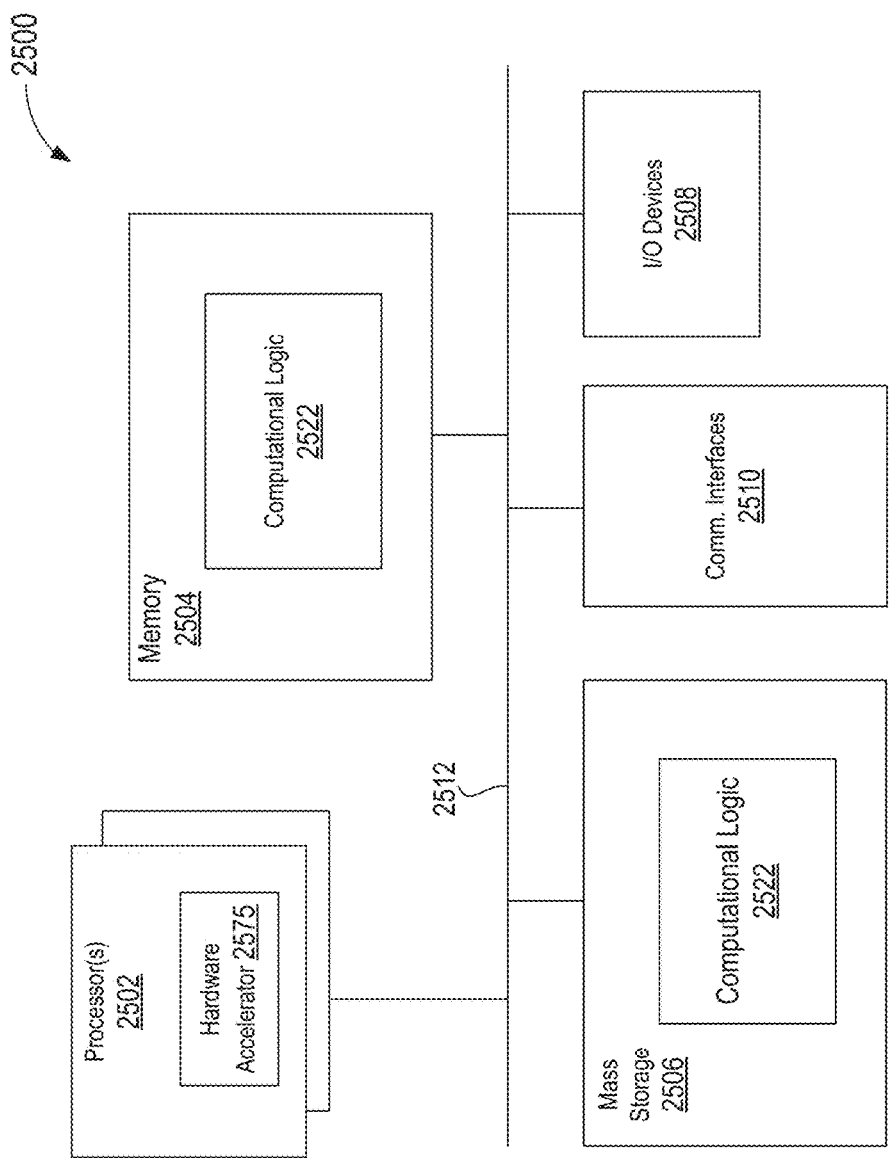

FIG. 25 illustrates a block diagram of a computer device suitable for practicing the present disclosure, in accordance with various embodiments.

Figure 26:
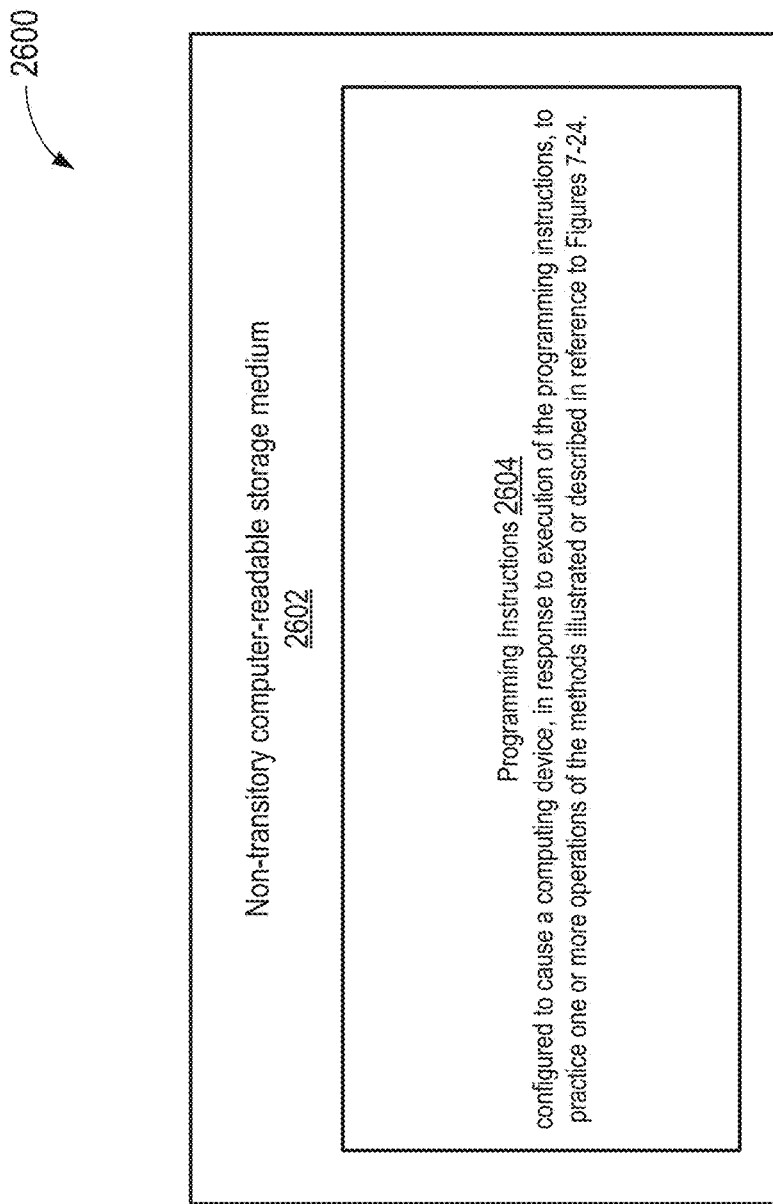

FIG. 26 illustrates an example computer-readable storage medium having instructions configured to practice aspects of the processes described in, or in connection with, FIGS. 7-24, in accordance with various embodiments.

DETAILED DESCRIPTION

The present disclosure describes embodiments with reference to the drawing figures listed above. Persons of ordinary skill in the art will appreciate that the description and figures illustrate rather than limit the disclosure and that, in general, the figures are not drawn to scale for clarity of presentation. Such skilled persons will also realize that many more embodiments are possible by applying the inventive principles contained herein and that such embodiments fall within the scope of the disclosure which is not to be limited except by the claims.

When integrating 3D objects in a mixed reality view, the 3D objects often appear to be an overlay, and not part of the real world depicted in a background image. To better composite a digital 3D object onto a real world image, in embodiments, real world scene lighting may be estimated using device cameras and sensors. Based on a set of samples of the background image taken at points nearby the user selected position of the digital 3D object, in embodiments, a 3D lighting configuration for the object may be inferred in real time, which may approximate real world lighting conditions. Thus, in embodiments, 3D objects may be integrated with images of the physical world in a convincing manner. Using algorithms according to various embodiments, input from even a monocular RBG sensor may be successfully used as a background image source. In other embodiments, exemplary techniques may scale to multi-sensor devices as well.

In embodiments, digital 3D objects may be depicted as shadowed when placed in darker areas of a background image, and brightened when placed in areas of the background image that have stronger lighting. Additionally, in embodiments, color tinting may be used to emulate indirect lighting, including light reflected onto the 3D object from surrounding objects in the background image.

In the description to follow, reference is made to the accompanying drawings which form a part hereof wherein like numerals (or, as the case may be, the last two digits of an index numeral) designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Also, it is noted that embodiments may be described as a process depicted as a flowchart, a flow diagram, a dataflow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function. Furthermore, a process may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

As used hereinafter, including the claims, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may implement, or functions associated with the circuitry may be implemented by, one or more software or firmware modules.

As used hereinafter, including the claims, the term "memory" may represent one or more hardware devices for storing data, including random access memory (RAM), magnetic RAM, core memory, read only memory (ROM), magnetic disk storage mediums, optical storage mediums, flash memory devices and/or other machine readable mediums for storing data. The term "computer-readable medium" may include, but is not limited to, memory, portable or fixed storage devices, optical storage devices, wireless channels, and various other mediums capable of storing, containing or carrying instruction(s) and/or data.

As used hereinafter, including the claims, the term "computing platform" may be considered synonymous to, and may hereafter be occasionally referred to, as a computer device, computing device, client device or client, mobile, mobile unit, mobile terminal, mobile station, mobile user, mobile equipment, user equipment (UE), user terminal, machine-type communication (MTC) device, machine-to-machine (M2M) device, M2M equipment (M2ME), Internet of Things (IoT) device, subscriber, user, receiver, etc., and may describe any physical hardware device capable of sequentially and automatically carrying out a sequence of arithmetic or logical operations, equipped to record/store data on a machine readable medium, and transmit and receive data from one or more other devices in a communications network. Furthermore, the term "computing platform" may include any type of electronic device, such as a cellular phone or smartphone, a tablet personal computer, a wearable computing device, an autonomous sensor, personal digital assistants (PDAs), a laptop computer, a desktop personal computer, a workstation, a video game console, a digital media player, an in-vehicle infotainment (IVI) and/or an in-car entertainment (ICE) device, an in-vehicle computing system, a navigation system, an autonomous driving system, a vehicle-to-vehicle (V2V) communication system, a vehicle-to-everything (V2X) communication system, a handheld messaging device, a personal data assistant, an electronic book reader, an augmented reality device, and/or any other like electronic device.

Figure 1:
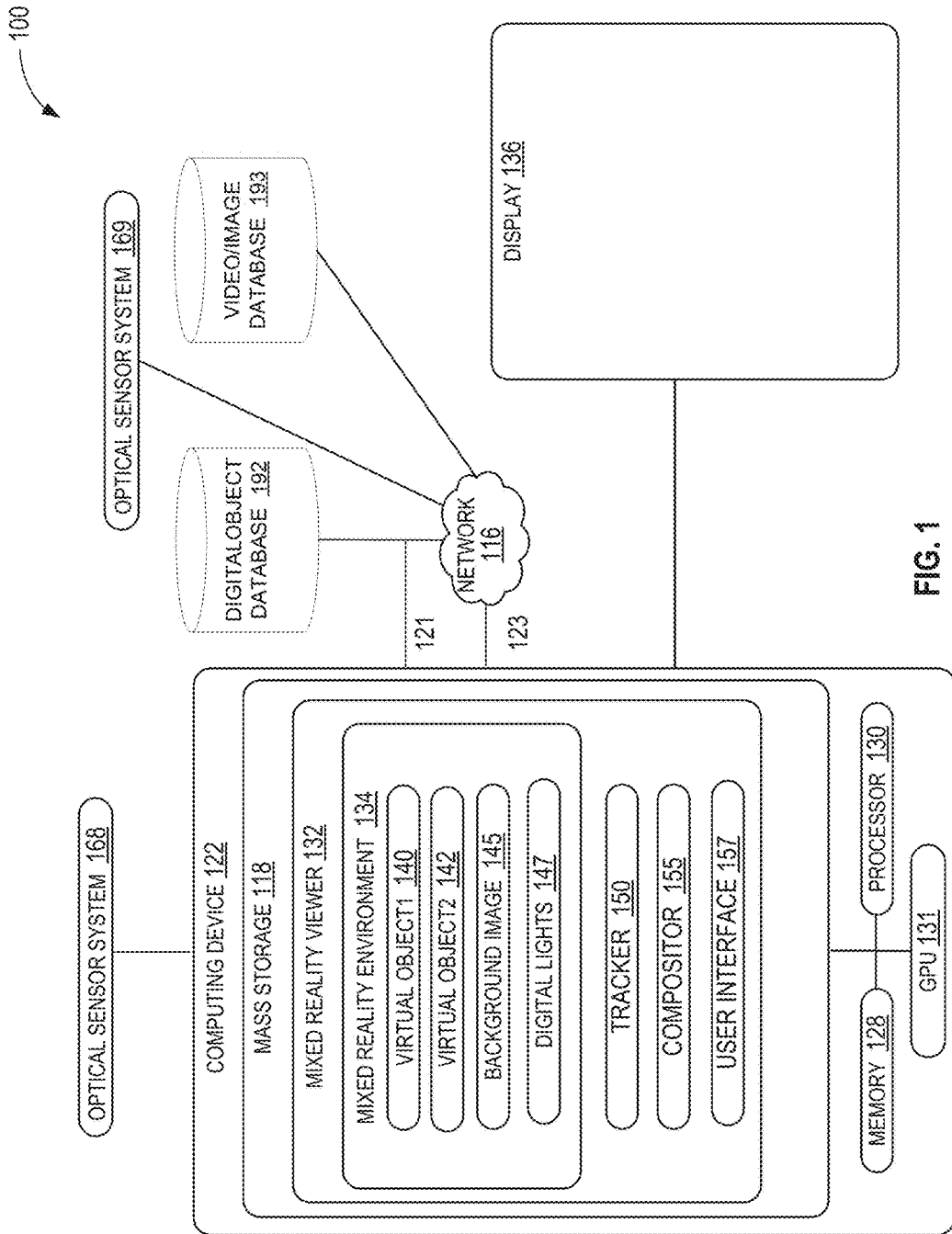

FIG. 1 shows a schematic view of one embodiment of a system 100, in accordance with various embodiments. System 100 may include a mixed reality viewer 132 that may, for example, be stored in mass storage 118 of a computing device 122. Mixed reality viewer 132 may be loaded into memory 128 and executed by a processor 130 of computing device 122 to perform one or more of the methods and processes described in more detail below. In embodiments, some tasks, such as, for example, rendering of 3D objects, planes and the like, may be performed by graphics processing unit (GPU) 131, under the control of, or in conjunction with, processor 130.

In embodiments, mixed reality viewer 132 may generate a mixed reality environment 134 that may be displayed to a user via a display device, such as, for example, display device 136. As described in more detail below, virtual environment 134 may include one or more virtual objects, such as virtual object1 140, virtual object2 142, and a background image 145. Such virtual objects may include one or more digital or virtual images, such as, for example, three-dimensional (3D) digital objects as described below with reference to FIGS. 3-7 3D holographic objects, other virtual objects, as well as two-dimensional images, that may be selected by a user and inserted into mixed reality environment 134 by, for example, the user interacting with mixed reality viewer 132 via user interface 157. These digital objects may be selected from a set of digital objects stored in digital object database 192, to which computing device 122 may be directly coupled, as shown by link 121, or, for example, to which it may be coupled over link 123 to network 116.

Mixed reality viewer 132 may further include a tracker 150, to track any virtual object that may be inserted into mixed reality environment 134 and to determine its position, orientation and scale, for example, as it may be moved through mixed reality environment 134 by a user. In what follows, the position, orientation and scale of an object may sometimes be referred to as its "transform." Additionally, mixed reality viewer 132 may further include a compositor 155, which, given the position, orientation and scale of a virtual object as determined by tracker 150, may infer local lighting for each virtual object present in mixed reality environment 134, and determine the values of one or more digital illumination sources, or digital lights 147, to illuminate each such virtual object according to one or more of the methods and processes described in more detail below.

Computing device 122 may include an optical sensor system 168, such as a camera, for example. Optical sensor system 168 may obtain a live video feed, which may be the source of background image 145 onto which one or both of virtual object1 140 and virtual object2 142 may be composited in mixed reality environment 134. Alternatively, computing device 122 may be connected over a network 116 to a remote optical sensor system 169, which may alternatively or additionally provide a live video feed to mixed reality viewer 132, which may be used as background image 145. Still alternatively, background image 145 may be loaded into mixed reality viewer 132 from memory 128, or from video/image database 193, connected to computing device 122 via network 116 over link 123. In embodiments, optical sensor systems 168 and 169 may include a monocular RBG sensor, for example.

In embodiments, computing device 122 may take the form of a desktop computing device, a mobile computing device such as a smart phone, laptop, notebook or tablet computer, network computer, home entertainment computer, interactive television, gaming system, or other suitable type of computing device. Additional details regarding the components and computing aspects of computing device 122 are described in more detail below with reference to FIG. 25.

In embodiments, computing device 122 may be operatively connected with display device 136 using a wired connection, or may employ a wireless connection via WiFi, Bluetooth, or any other suitable wireless communication protocol. For example, computing device 122 may be communicatively coupled to a network 116. Network 116 may take the form of a local area network (LAN), wide area network (WAN), wired network, wireless network, personal area network, or a combination thereof, and may include the Internet.

As described in more detail below, computing device 122 may communicate with one or more other computing devices, such as a server (not shown), via network 116. Additionally, the example illustrated in FIG. 1 shows computing device 122 as a separate component from display device 136. It will be appreciated that in other examples computing device 122 may be integrated into display 136.

As noted above, when integrating 3D objects in mixed reality they may often feel, to a viewer or user, like an overlay, and not as part of the real world depicted in a background video frame or image. To address this problem, and thus to better composite a digital object onto a real world background, in embodiments, the real world scene lighting may be estimated using device cameras and sensors. Then, in embodiments, a 3D lighting configuration of the real world background image may be inferred in real time, and replicated digitally to approximate the real world lighting conditions of the background image and apply them to the composited 3D objects.

In embodiments, digital objects, such as, for example, 3D objects, may thus integrate with the physical world in a convincing manner. Algorithms according to various embodiments may operate quickly, so as to support real time applications, and may, for example, run using, at a minimum, input from a monocular RBG sensor, while also scaling to multi-sensor devices as well.

Thus, in embodiments, 3D objects may be displayed in a mixed reality viewer as shadowed when placed in darker areas, and brightened when placed in stronger lighting. In addition, in embodiments, color tinting may be used to emulate indirect lighting.

Figure 2:
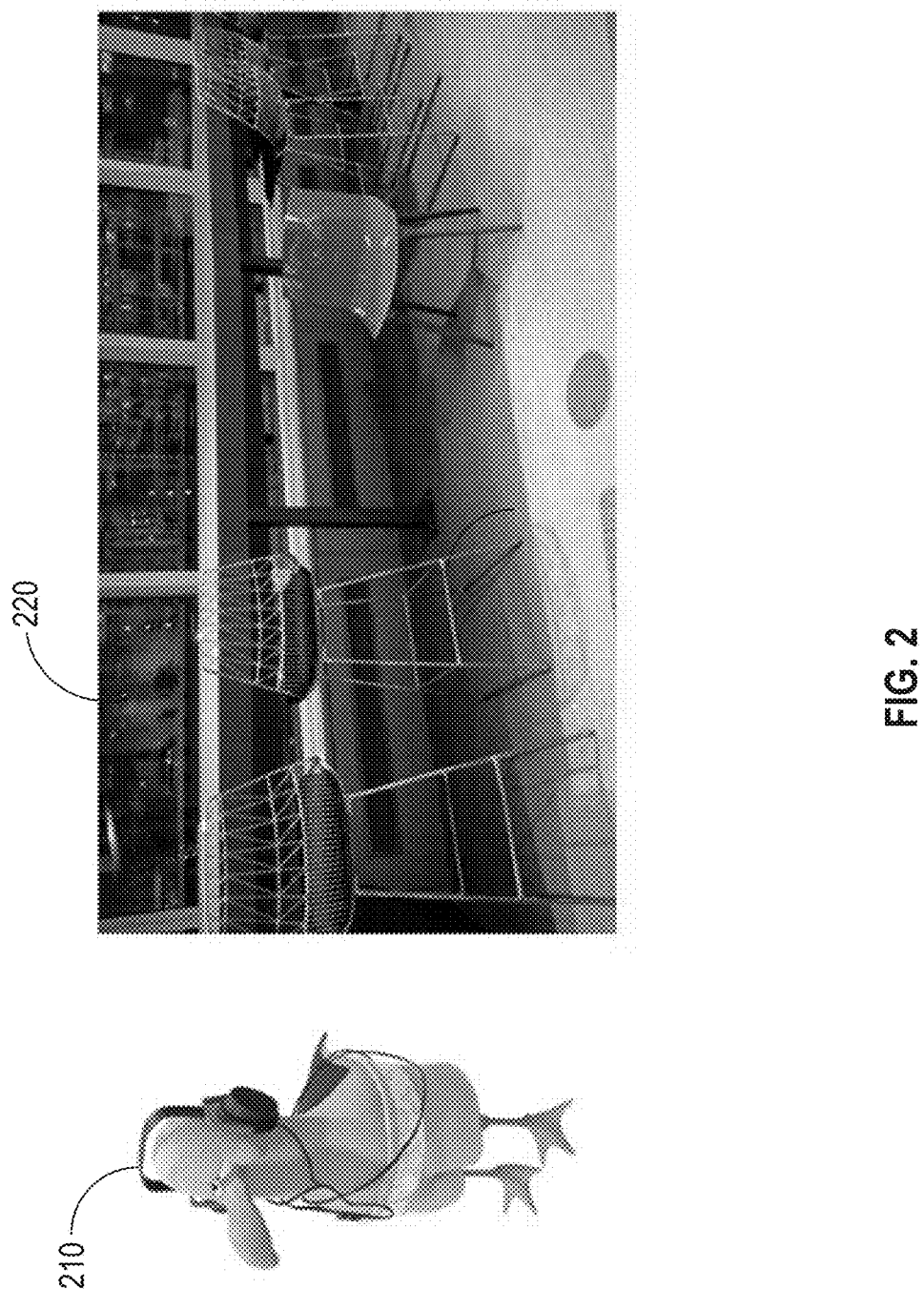
FIG. 2 illustrates an example object and an example video frame into which the object is to be composited, in accordance with various embodiments.

FIG. 2 illustrates an example digital object 210, a 3D bird who wears short pants and has headphones, and an example video frame 220, showing a room with a table and chairs positioned next to a set of windows. It is noted that video frame 220 may, for example, be either a live image acquired by a camera, or, for example, a frame of a pre-existing video file, as noted above. The example 3D bird object 210 may be composited onto the video frame showing the room, in accordance with various embodiments. It is noted that in the example of FIG. 2, object 210 may be a 3D model which may be combined onto a video frame 220. Alternatively, video frame 220 may be a frame in a previously stored video file or clip, which may, for example, be stored in memory on a standalone computing device, or, for example, may be received on a computing device from another computing device, across a network. Still alternatively, video frame 220 may be a single image, taken with a camera or image sensor, and not necessarily part of a video clip at all. It is here noted that as used herein, the term "compositing" is understood to mean the combination of visual elements from separate sources into a single image to create the illusion of a single scene.

Figure 3:
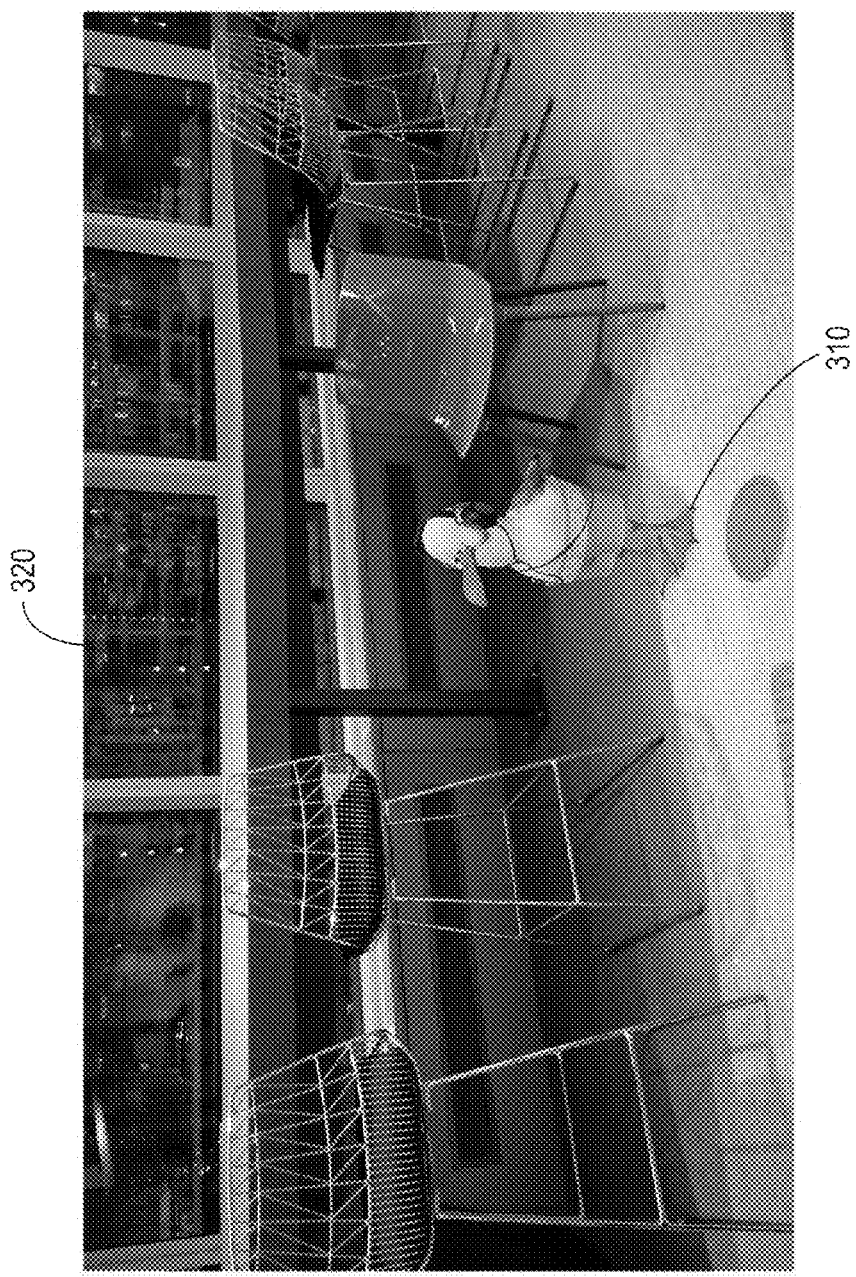
FIG. 3 illustrates the example object and video frame of FIG. 2, after being composited, in accordance with various embodiments.

FIG. 3 illustrates the example bird object 310 and example video frame 320 as shown in FIG. 2, after being composited, in accordance with various embodiments. In the example of FIG. 3, bird 310 is to be inserted into video frame 320 so that bird 310 appears as standing in the room depicted in video frame 320, which in this example may be a frame of a live video feed. As described more fully below, in order to create that natural look, in embodiments, the lighting on 3D bird object 310 in the mixed (composited) image may be adjusted so as to match the lighting in the video frame 320.

Figure 4:
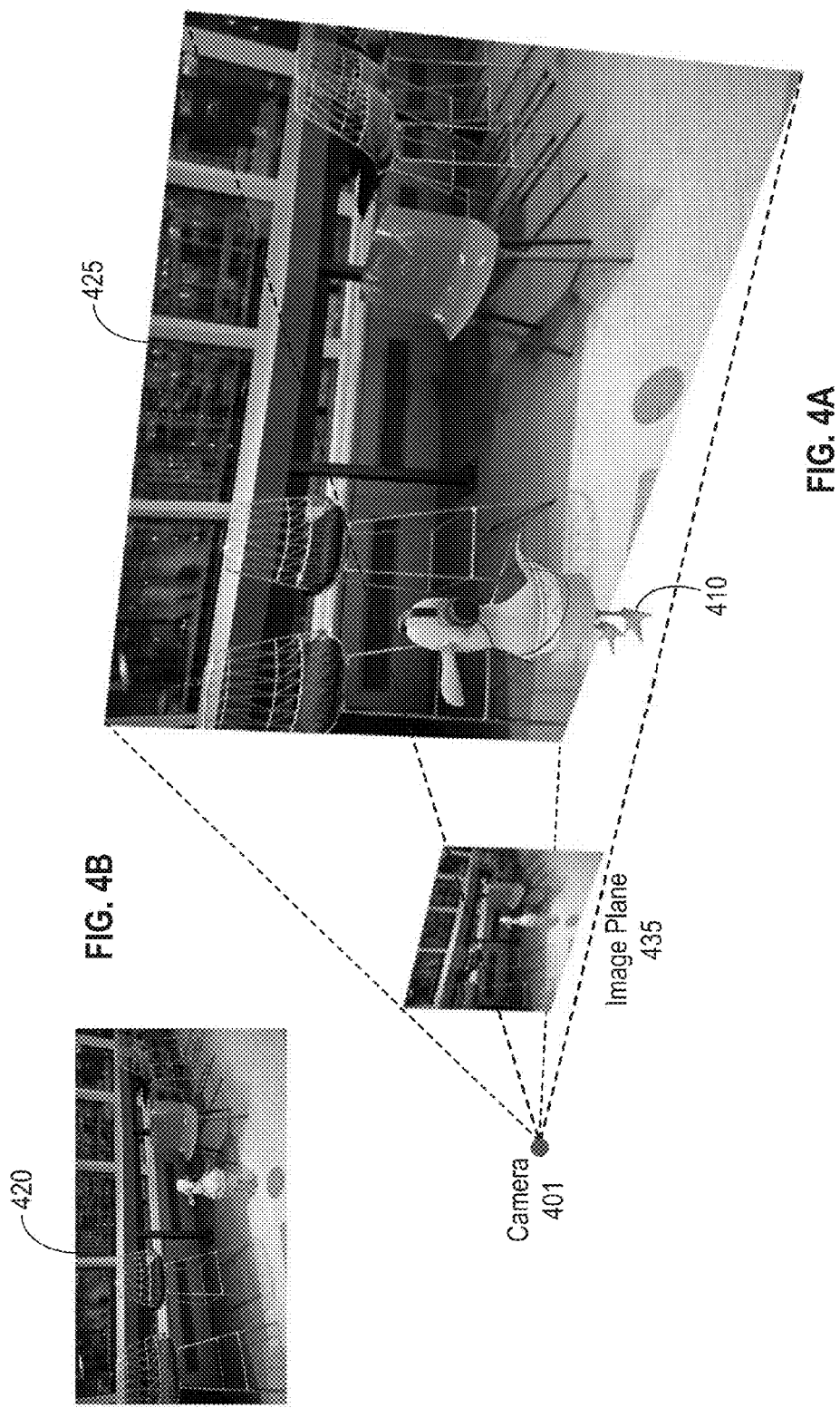

FIG. 4A further illustrates an example camera perspective for a mixed reality viewer in accordance with various embodiments. FIG. 4B illustrates the result of compositing in the mixed reality viewer. In the case of a mixed reality viewer as shown in FIG. 4, there may be two image sources, such as, for example, a live camera feed that generates video frame 425, acquired by a camera 401 (not shown), and a virtual 3D object 410, inserted by a user of the MRV into the scene, as noted above. Using tracking techniques, such as, for example, a feature based tracker, the 3D object 410, here a bird, may be inserted in the scene depicted by the live camera feed at a user preferred location. The desired result is an object that feels, as seen by a user or viewer, to be genuinely part of the world that is captured through the eye of camera 401. In mixed reality viewer embodiments, the tracker may take care of the location while a compositing module may be used to best integrate the object visually. The end result of the compositing is an image such as shown in image plane 435, as shown in the perspective of camera 401, and as shown as may be seen on a computing device screen in FIG. 4B, as image 420.

It is here noted that, in general, there are various techniques that may be used for compositing. Many, in fact, are utilized by filmmakers in post-production of cinema. However, in the case of a MRV there may be several constraints that, in embodiments, tend to drive what may or may not be done, and thus require different solutions. In embodiments, these constraints may include, for example, real time and limited computational resources (in general, a tracker and a camera may have priority in an example MRV application), viewing conditions, user movement (the digital object may enter and go out of the frame), auto adjustment of a camera or image sensor, RGB only cameras (no depth sensor, no depth information out of the box). In embodiments, real-time compositing must operate subject to one or more of these constraints.

In general, a user of a MRV may define one or more digital light sources with which to illuminate a digital object introduced into a given scene. The collection of these digital light sources may be known as a "light rig" associated with an object. As described in detail below, in embodiments, each digital object to be inserted into a MRV frame may have its own light rig. FIG. 5 illustrates an example light rig, in accordance with various embodiments. In the example light rig of FIG. 5, there are two main directional light sources, right light 510 and left light 520, positioned (virtually, in an example MRV) on each side of camera 501, at a lateral distance 503 from camera 501, and at a height 505 from camera 501, in the 3D space of the camera's perspective. As shown, each of right light 510 and left light 520 point towards the object to be composited 530, here the bird of FIGS. 2-4, from in front and above, as shown. As further shown in FIG. 5, 3D digital object 530 may be positioned on a virtual ground plane 550, shown here as a grey circle. The virtual ground plane may be used, in embodiments, for an example shader functionality, as described in detail below.

Continuing with reference to FIG. 5, in embodiments, light sources 510 and 520 may preferably face the digital object (e.g., be in front of the 3D digital object 530, as shown), in a 3D space of the camera's perspective so that the model never looks "flat", which would remove a sense of dimensionality. It is here noted that in alternate embodiments a fill light source, that provides light from underneath object 530 may be used, however, it is noted, that approach may sometimes bring too much light from under the model. Such an approach is thus more unusual, as on average most light comes from the top of a given object. The back limit of the camera's perspective is image plane 540, as shown, behind the 3D digital object 530. The net result of the 3D digital object, as placed in its 3D position, and as illuminated by right light 510, and by left light 520, is composited image 535.

In addition to the light sources 510 and 520, as described in greater detail below, an ambient light source may also be provided, which may operate as an environment tint. Thus, in embodiments, the ambient light source has no specific position in the mixed reality view.

FIG. 6A illustrates the light rig of FIG. 5, from an upper, or "bird's eye view" viewpoint, where the width dimension of FIG. 6 is the depth dimension of FIG. 5. Thus, right light 610 and left light 620 are shown in their true virtual positions in an exemplary mixed reality view. Similarly, the position of camera 601 is in front of digital object 630, in similar fashion to the viewpoint shown in FIGS. 4A and 5A, as described above, and image plane 635 is also shown in its positon relative to camera 610 and the two light sources 610 and 620. 3D digital object 630 may be, as shown, provided on top of virtual ground plane 650.

FIG. 6B is a side perspective view of the light rig shown in FIG. 6A, the index numbers referring to the same elements as already described with reference to FIG. 6A.

FIGS. 7A-11C, next described, illustrate an example process for determining the values of a light rig, as shown in FIGS. 6A and 6B, for an example 3D object composited with a video frame in a mixed reality view, in accordance with various embodiments.

With reference to FIG. 7A, a perspective view of an example mixed reality viewer is shown. FIG. 7A is thus an exploded view of what a user sees, which is the view of FIG. 7B. The perspective view shows a 3D space 715, where an example video frame is provided as a plane 710 at the back of the 3D space. In embodiments, within the environment of a mixed reality viewer, a user may choose a digital object, and insert it into 3D space 715. Thus, as shown in FIG. 7A, an example digital object 730 has been inserted into a mixed reality view together with video frame 710, as shown. As noted above, video frame 710 may be a frame in a real-time video feed acquired by a camera, such as, for example, optical sensor systems 168 or 169, of FIG. 1. Alternatively, video frame may be a previously acquired image that is loaded from memory into an example mixed reality viewer. Continuing with reference to FIG. 7A, example digital object 730 may be a white bird with headphones and light blue short pants, and, as shown in FIG. 7A, may be placed by a user into the 3D space 715 of an exemplary mixed reality viewer, which may be, for example, mixed reality viewer 132 of FIG. 1.

As noted above, a tracker, in embodiments, also part of a mixed reality viewer, may be used to calculate the relative orientation and position of digital object 730 within 3D space 715. This may occur once a user has placed the digital object there, such as, for example, via user interface 157 of FIG. 1. Once the position and orientation of digital object 730 is obtained from such a tracker, in embodiments, a 3D bounding box 735 may be calculated surrounding the dimensions of digital object 730. With reference to FIG. 7A, 3D bounding box 735 is shown in yellow. As shown, 3D bounding box 735 tracks the orientation of 3D object 730, which is rotated, relative to video frame 710, by approximately 30 degrees to the left of the figure (from a front view perspective), such that the bird is turned to his right.

In embodiments, a 2D bounding region 720 may be calculated from the outer dimensions of 3D bounding box 735. As shown in FIG. 7A, 2D bounding region 720 may be the projection of 3D bounding box 735 onto a 2D plane 718 provided at the front of 3D space 715, and parallel to video frame 710. 2D plane 718 may be hereinafter referred to as a "projection plane" or an "image plane." It is noted that while such a projection of 3D bounding box 735 onto 2D plane 718 may result in a slightly larger 2D bounding region than a closer fit, it was nonetheless seen by the inventors to work well in terms of color sampling, as described below.

The reason why such a projection may result in a slightly larger 2D bounding region, it is noted, is that a 3D bounding box is, itself, a conservative approximation of the bounds of an example object's real shape. Thus, the volume of the 3D bounding box is always larger than the volume of the actual 3D object. Thus, a projection of its volume onto the image plane generally results in an area larger than a "perfect" projected image of the object. It is noted that 2D bounding region 720 allows for the gathering of color information close to the 3D object. E.g., by retro projection of points on the 2D bounding region 720 into the 3D space, the resulting points in the 3D world are more likely to be in the 3D neighborhood of the object.

FIG. 7B presents a front view of the mixed reality image of FIG. 7A, as may normally be seen by a user of a mixed reality viewer. With reference to FIG. 7A, 2D bounding region 720 is shown as surrounding the outer boundaries of 3D bounding box 735, as projected onto the 2D screen space 718.

FIG. 8 illustrates the creation of mipmaps from the background image or video frame, in accordance with various embodiments. With reference to FIG. 8, a set of mipmaps 810 is shown. It is noted that a set of mipmaps refers to an optimized sequence of images, each of which is a progressively lower resolution representation of the same image. For example, in the mipmaps of FIG. 8, each mipmap to the left of its "parent" averages the colors of a 2×2 pixel volume of the parent mipmap into one color value. In embodiments, by use of mipmaps, noise may be removed, as a lower resolution mipmap is less prone to quickly change. In embodiments, this may be the case both spatially, and frame to frame. As regards spatially, when a model is moved across the screen, the resulting lighting may be smoother as mipmaps tend to act as a smoothing function over an area of pixels. Similarly, as regards changes from frame to frame, if the background itself changes, an abrupt change in some pixels may, for example, average out with the rest of the pixels, thereby avoiding sudden changes in lighting. It is understood, of course, that if a very large part of the background were to change abruptly, such as, for example, if the lights were turned off in the real world scene being captured in real-time, a mipmap would have a more difficult time in smoothing out the changes, as expected.

Continuing with reference to FIG. 8, the highest resolution version of video frame 710 (from FIG. 7) is at the far right, and the lowest resolution is that at the far left of the FIG. 8. In embodiments, a mipmap may be chosen for each 3D object, and its color values may be sampled at a set of points surrounding the 3D object. This process is next described.

FIGS. 9A and 9B depict mipmap selection, in accordance with various embodiments. With reference thereto, it is noted that the 2D region 920 calculated as described above in connection with FIG. 7, may be used to determine which mipmap to use for color sampling to determine the light rig for the 3D object in the mixed reality composition. By sampling the colors of a mipmap along the periphery of a bounding region of the 3D object, local lighting near the 3D object may be inferred. In so doing, the pixel averaging nature of mipmaps may be leveraged, which prevents loss of information, as no under-sampling is performed. Moreover, in embodiments, this use of mipmaps may provide more predictable lighting while scaling the 3D model, and may allow the lighting to correctly update when a point of view of the 3D object changes, such as, for example, when a user moves (both via translation and/or rotation) the 3D object through 3D space 715, as shown in FIG. 7A, or even scales the object as it may move, to achieve a pan-in or pan-out effect.

As shown in FIGS. 9A and 9B, in this example, there are actually two 3D objects inserted into the mixed reality view of video frame 910. These are bounded by 2D bounding regions 920 (the larger one, foreground), and 925 (the smaller one, background), respectively, as shown. Because 2D bounding region 920 is significantly larger than 2D bounding region 925, to sample colors near 2D bounding region 920, a lower resolution mipmap may be chosen, such as mipmap 950, as shown. On the other hand, given the smaller size of 2D bounding region 925, in order to have enough color samples along the periphery of 2D bounding region 925, a significantly higher resolution mipmap, such as mipmap 955, may be chosen.

FIG. 10 illustrates an example sampling of mipmap in the region of a 3D object, in accordance with various embodiments. As noted above, in embodiments, the size of a 2D bounding region in a projection plane may be used to choose an appropriate mipmap for sampling. In embodiments, to provide sufficient granularity, a mipmap should have multiple samples (pixels) along each dimension of the 2D bounding region. In embodiments, this is a function of the size of the 3D object (at the chosen scale) within the 3D space of the mixed reality viewer for a given video frame, as described above. In the example of FIG. 10, there are 4 pixels along the horizontal dimension of 2D bounding region 1020, and 5 pixels along the longer vertical dimension. In embodiments, the shorter dimension of 2D bounding region may have at least 4 pixels, for example.

In embodiments, a closer fitting bounding region to a 3D object may be generated from the rectangular 2D bounding region, for actual color sampling. For example, as shown in FIG. 10, in embodiments, an ellipse 1021 may be generated from rectangular 2D bounding region 1020, so as to sample the colors of pixels of the chosen mipmap that are actually closer to the object. In embodiments, the texture may then be sampled at an integer number of positions around the closer fitting bounding region, here ellipse 1021, using bilinear filtering. In embodiments, N may equal 8, as shown, thus acquiring samples 1031, 1032, 1033, 1034, 1035, 1036, 1037, and 1038. Alternatively, N may equal 12, 16 or other appropriate values. It is here noted, in this context, that mipmap selection is thus linked to a number of samples that may be obtained, as described above. Thus, in embodiments, the following formulae may be used to compute sampling extents and select an appropriate mipmap. Initially, in embodiments, sampling extents may be computed by:

SamplingExtents=(SampleCount/2)+1, where samples are assumed to be uniformly distributed around a bounding region perimeter, e.g., an ellipse. Then, an appropriate background mipmap may be selected using the following equation:

mipmapLevel=max(log 2(ScreenBounds.width/SamplingExtents),log 2(ScreenBounds.height/SamplingExtents)), where ScreenBounds is assumed to be in "background pixels" (Bg0).

It is here noted that "color" in texture sampling is an umbrella term that includes both hue and intensity. In general, textures may have a wide range of formats and, for example, if a high dynamic range (HDR) capable camera were used to acquire the background image, together with an HDR display, the color samples may have values in excess of the regular 8 bit per channel color range. In such example embodiments, the RGB triplet may represent intensity and hue (as low dynamic range RGB triplet) by having the intensity pre-multiplied to each channel. Alternatively, if values were to be separated, the weighting may be applied as follows:

WeightedSampleColor=(Sample.*RGB*\*sample.Intensity)\*Sample Weight.

Thus, in embodiments, a set of color samples, obtained along the periphery of ellipse 1021 may be obtained. From these samples one or more digital light sources may be obtained, such as, for example, the left light and right light described above with reference to the light rig of FIG. 6. Once these values are obtained, the rendering pipeline of an example mixed reality viewer may combine the color of the object with the color of the light from each digital light source.

FIGS. 11A through 11C, next described, illustrate combining samples using different weightings to obtain a color value for each of two digital lights, in accordance with various embodiments. With reference to FIG. 11A, left light 1151, and right light 1150, may, in embodiments, each combine the eight color samples 1131-1138, obtained along the periphery of bounding ellipse 1121, using a sum of weighted samples, where the sum of the weights per light is assumed equal to 1. For example, the digital lights may be computed, in general, using the following equation:

$$\text{LightColor } i = \Sigma_{k=0}^{SampleCount}(\text{SampleColor } k)^* (\text{weights } i,k).$$

Continuing with reference to FIG. 11A, it is noted that six of the samples at the bottom of the ellipse 1121, namely samples 1131, 1132, and 1133 on the bottom right, and 1137, 1138 and 1131 on the bottom left, are respectively weighted with a zero weighting depending on which light (e.g., right or left) is being calculated. With reference to FIG. 11B, which illustrates the calculation of right light 1150, samples 1131, 1138 and 1137 are weighted at zero. The remaining five samples have positive weights, the largest weight given to sample 1134, which is the closest to right light 1150 in this example. It is here noted that in other embodiments, more than two digital lights may be calculated. Moreover, the position and orientation of each light, no matter how many are being calculated altogether, may be defined by the program, or by a user of the program, within a 3D space, such as 3D space 715, with reference to FIG. 7.

Thus, in accordance with various embodiments, which sample along a given 2D bounding shape will have a greater or lesser weighting is, in general, a function of the orientation and position within the 3D space of the digital light for which that sample is an input. Continuing now with reference to FIG. 11C, the weights of the samples to be used to calculate the color of left light 1151 are shown. FIG. 11C thus illustrates the inverse situation of FIG. 11B, and here as well, the samples farthest away from left light 1151, namely samples 1131 1132, and 1133, have a weighting of 0, and the sample closest to left light 1151, sample 1136, has the largest weight, namely 0.555. It is noted that, from inspection of the calculated colors of each of right light 1150 and left light 1151 in FIGS. 11B and 11C, respectively, it can be seen that right light 1150 has a greater red color input from primary sample 1134, and left light 1151 has a greater brownish hue, due to primary sample 1136.

FIGS. 12A and 12B illustrate lighting of an example 3D object composited with a background image, as a function of then prevailing light in the background image, in accordance with various embodiments. Thus, with reference to FIG. 12A, the example 3D object, which may be called a monster, which is provided at the right side of each of FIGS. 12A and 12B, is lit differently in each of those composited images depending upon the then prevalent lighting conditions of the background image. It is noted that the two background images shown in FIGS. 12A and 12B are of an identical location in a mall, but taken under two different actual lighting conditions. Thus, FIG. 12A is brighter, and thus so is the monster, and FIG. 12B is darker, and correspondingly, so is the monster.

FIGS. 13A and 13B illustrate another example lighting of an example 3D object composited with a background image, as a function of light intensity in the background image, in accordance with various embodiments. In FIGS. 13A and 13B it is not the then prevalent actual lighting that varies between the two images, but rather the relative position to the background image at which the 3D object is placed. With reference to FIG. 13A, the example "red blob monster" 3D object 1320 is lit and colored differently depending on whether it is placed above the blue garbage can, as in FIG. 13A, where or inside it, which is a locally much darker portion of the background image, as shown in FIG. 13B.

FIGS. 14A and 14B respectively illustrate a generic reflection map, and the use of an ambient color value to tint reflection and adjust intensity, according to various embodiments. It is noted that use of a generic reflection map, such as is implemented in FIG. 14A, generally refers to a single reflection map, that may work well in neutral well-lit environments. However, it is noted, real-world environments are less predictable. Thus, FIG. 14B illustrates the use of the ambient color value to tint reflection and adjust intensity, in accordance with various embodiments. In embodiments, the ambient color, which, as described above, may be an average of all of the color samples obtained along the periphery of an example bounding region, such as an inscribed ellipse derived from a 2D rectangular bounding box, as described in connection with FIGS. 10-11C above, may, in embodiments, be used to tint reflection and adjust intensity. In embodiments, this may help to tone down white highlights in dark scenes, as well as help reflection color match with environment.

Continuing with reference to FIG. 14A, there is shown an example red car 3D object 1440, positioned near a metallic fork real world object 1430, both sitting on a blue table. FIG. 14B shows the same two objects, but positioned on a set of pink cushions, such as are provided on outdoor furniture, or the like. FIGS. 15A and 15B are magnified views of the tip of fork 1530 and the tire rim 1541 of red car 1540, of FIGS. 14A and 14B, respectively. With reference to FIGS. 15A and 15B, by comparison, whereas there is no noticeable coloring of the fork 1530 or the tire rim 1541 of red car 1540 in FIG. 15A, in FIG. 15B each of these objects has a pinkish tint to simulate reflection of the ambient light in their respective locale. In particular, in this example the ambient light color was applied to a reflection contribution by tinting a reflection map used to light the example 3D object. In embodiments, an ambient light value, may, as noted above, be generated by averaging all of the samples (i.e., with no relative weightings applied) of their respective bounding regions.

In embodiments, in addition to dynamic lighting of 3D digital objects in mixed reality, shadow effects may also be generated for each 3D object, to further enhance the compositing. FIGS. 16A and 16B illustrate example soft shadow effects, in accordance with various embodiments, for each of two 3D objects added to a real world background image, here a desktop with a power strip, adjacent to a computer display base.

With reference to FIGS. 16A and 16B, each of the motorcycle of FIG. 16A, and the superhero of FIG. 16B, both 3D digital objects, may, in embodiments, have shadows digitally added to the composited image, as shown, so that the 3D digital objects appear to have the local lighting of the background image, at their respective locations. By way of comparison, the real world wires seen directly behind each 3D object cast an actual shadow on the desktop, where the light appears to emanate from. In this example the actual real world light is coming from office lighting, here LED light fixtures, from above. Thus, in embodiments, a custom shader (shadow simulator) may be implemented that may emulate directional light from the top, and may assume a mostly diffuse light environment. In embodiments, this may be implemented by an example mixed reality viewer according to various embodiments passing a vertical light direction to the shader parameters. In addition, the diffuse aspect may be expressed by tuning a shader to blur a shadow when a distance of the shadow caster form the ground plane is very large. It is here noted that, in embodiments, these parameters may be controlled by a given application, and may thus be changed dynamically or from an algorithmic based decision process.

In addition, in embodiments, a custom shader may utilize distance-attenuated blur and intensity, and may, in embodiments, not be as dynamic as lighting of the 3D object using an example light rig, as described above. Thus, in such embodiments, a custom shader may not change the shadows cast as a function of the direction of real world lighting, or as a function of real world shadow color. It is noted, however, that in other embodiments, these shadow parameters may be dynamically changed, and the example shader process provided below does not preclude such dynamic change of shader parameters. In embodiments, a single neutral color, such as, for example, grey, where R, G and B values are equal, and thus their value only drives the intensity of the color, may be used in a custom shader. In embodiments, a custom shader may implement a process as described in the following pseudocode:

Given the following inputs:
   A 3D model
   A virtual ground plane
   A 3D rendering system
   Algorithm
   A. Compute 3D bounds of the 3D model (ModelBounds);
   B. Place a virtual camera ($C_{shadow}$) outside of the 3D model bounds (ModelBounds) and below the virtual ground pointing upward, the virtual camera set to select only closer depth values;
   *(direction doesn't have to be exactly vertical, any upward direction will do) (alternate version: place virtual camera above the model pointing downward but only select further depth values);
   C. Render the depth component of the 3D object from point of view and store it in an addressable memory $M_{shadow}$ (for example Texture memory);
   D. Place another virtual camera ($C_{viewer}$) where a viewer is to look at the 3D object from;
   E. Render the 3D object normally; and
   F. Render the ground plane using the following algorithm:
      For each point ($P_{ground}$) of the ground plane:
         a. Compute the distance of ($P_{ground}$) from ($C_{shadow}$) point of view ($D_{ground}$)

b. Compute ($P_{ground}$) coordinate in $M_{shadow}$ and get the corresponding 3D model depth value ($D_{model}$)
C. Compute difference between $D_{delta}=D_{ground}-D_{model}$
d. Normalize $D_{delta}$ using model bounds
e. Use $D_{delta}$ magnitude to compute:
   i. Shadow intensity, and
   ii. Shadow blur radius.

It is here noted that, the closer the match in resolution between a background image and a visual element, the more realistic the composited image appears. Thus, a high resolution object composited onto a low resolution camera frame may look out of place, and sometimes seriously so. In embodiments, by adjusting the pixel resolution of the rendered object to match the resolution of the camera, a rendered object may appear more immersed in the real world as seen through the camera, and thus the mixed reality view more realistic.

Accordingly, in embodiments, resolution matching algorithms may be implemented according to the following pseudocode:

Given the following inputs:
Background 2D image
   Wb: background width in pixels
   Hb: background height in pixels
3D Model
3D Rendering system with a 2D output
   Wr: rendering output width in pixels
   Hr: rendering output height in pixels
2D display system (screen or any software window, for example)
   Wd: display horizontal resolution in pixels
   Hd: display horizontal resolution in pixels
Algorithm:
   1. Set rendering system output resolution to match that of the background;
      Wr=Wb;
      Hr=Hb.
   2. Render the 3D model and the background using any known composition technique;
   3. Output the rendered image to the 2D display using any existing image size remapping technique (for example, crop, or stretch), with or without conserving the aspect ratio of the rendered output.

With regards to the example resolution matching pseudocode provided above, it is noted that it is fully acceptable, in embodiments, for an example rendering system to internally use an antialiasing feature to enhance the quality of the output, as long as the final output is resolved to match the constraints Wr=Wb, and Hr=Hb.

FIGS. 17 through 22, next described, provide a sequential schematic illustration of the dynamic lighting of 3D objects in a mixed reality viewer, as illustrated and described above, with reference to FIGS. 7 through 11C. The sequence of schematics is followed by example pseudocode for the illustrated processes.

With reference to FIG. 17, a mixed reality view may include a background image 1701, and one or more visual elements 1705. Visual elements 1705 may be 3D, for example, as described above, or may be 2D, being essentially a bounded plane, at a certain position and orientation within a 3D space of a mixed reality environment. Visual elements 1705 may be bounded by a 2D bounding box 1710, which may be used as a local sample region to acquire samples of the background image to infer the lighting at the position of the visual element.

FIG. 18 illustrates elliptical conversion of 2D bounding box 1810 of visual element 1805 to ellipse 1811, and FIG. 19 illustrates sampling the color of background image 1901 at various sample points 1920, for example, eight (8), along the bounding ellipse 1911 generated in the elliptical transformation illustrated in FIG. 18, which closely surrounds visual element 1905.

FIG. 20 illustrates combining the samples illustrated in FIG. 19 using different weightings (not shown) to generate digital light values for each of an example digital left light 2015 and an example digital right light 2025. In general, all of samples 2031 through 2042 may be combined, with appropriate weightings, to obtain the final color values for the two lights in the light rig. However, in some cases, certain samples, due to being relatively farther away form a given light, may have their lighting set to 0, and thus they will provide no contribution to the final color value of the light. This is the case in the example of FIG. 20, where samples not used are depicted as being outside of the dotted ellipse for each light. Left light 2015 thus does not use the values of samples 2032, 2033 or 2034, which are shown as not being within dotted ellipse 2010, and similarly, right light 2025 does not use the values of samples 2040, 2041 or 2042, which are shown as not being within dotted ellipse 2020. It is noted that, in embodiments, the number of samples whose weighting is set to 0 need not be the same for each light source, although that is the case here, due to positional symmetry of the right light 2015 and the left light 2025 relative to visual element 2005.

FIG. 21 illustrates mipmap selection as a function of the size of an example visual element, in accordance with various embodiments. Thus, for a small visual element 2105, a higher resolution mipmap 2110 of a background image is needed, so as to have the visual element overlay a sufficient number of pixels of the mipmap to have a sufficient number of samples to capture variation of light color in the local region of the mipmap, as noted above. Similarly, for a large visual element 2106, a lower resolution mipmap 2150 of the background image may be used, inasmuch as, given the size of large visual element, a sufficient number of pixels of the mipmap, even at a lower resolution, and thus larger pixel dimensions in the mipmap, are overlaid by the visual element.

FIG. 22 illustrates simultaneously compositing multiple visual elements, such as, for example, small visual elements 2208 and 2209, larger visual elements 2206 and 2207, all positioned in the front portion of the 3D space of the mixed reality viewer, as well as medium sized visual element 2205 (a bear), positioned at the back of the 3D space, on top of an object depicted in the distance of Background image 2201. IN accordance with various embodiments, all of the visual elements may be composited onto Background image 2201, using the dynamic lighting techniques described above, on a per visual element basis. It is here noted that, in embodiments, there is no limit to how many visual elements may be supported. However, an upper bound may likely be what a given computing device may compute within an allotted time budget that an example mixed reality viewer application is given to compute a frame.

The following pseudocode is representative of the process schematically presented in FIGS. 17-22, and the process described above, with reference albeit more generalized, in accordance with various embodiments:

Given the following inputs
   Background (image) (Bg)
   Visual element (Ve)

Visual element transform, PRS={Position, Rotation, Scale}
Sample count (SampleCount)
LightCount, a number of lights to illuminate a visual element A.
Generate background (Bg) mipmaps [1]
  Mipmap(Bg)={Bg0, Bg1, Bg2, . . . BgN}
B.
For each Visual Element (Ve)
a. Compute Ve bounding 3D shape in Ve space (VeBounds)
(Bounding box, bounding sphere, convex volume, bounding box hierarchy . . . );
b. Compute background 2D screen space bounds (ScreenBounds) by projecting VeBounds onto the screen
(If necessary, ScreenBounds needs to be clamped to the screen boundaries);
c. Compute an ellipse (E) that is inscribed within ScreenBounds;
d. Compute the sampling extents using:

SamplingExtents=(SampleCount/2)+1

*(samples are assumed to be distributed uniformly around the ellipse perimeter)
e. Select one of the background mipmaps using mipmapLevel=max (log 2(ScreenBounds.width/SamplingExtents),log 2(ScreenBounds.height/SamplingExtents))

*(ScreenBounds is assumed to be in "background pixels" (Bg0))
f. Sample the selected background mipmap using the ellipse-distributed samples
  For each (i in [1,SampleCount])
  {
  SampleColor$_i$=SampleFunction(Bg$_{mipmaplevel}$, SamplePosition$_i$)
  }
*(SampleFunction is a bilinear image sampling function)
g. Compute light colors using sampled colors using a normalized weighted average technique:
For each(i in [1, LightCount])
{

$$LightColor\ i = (x+a)^n = \sum_{k=0}^{SampleCount} (SampleColor\ k) * (weghts\ i, k)$$

}
*(Weights are application specific and are usually defined as a function of sample and light properties)
*(the sum of weights per light is assumed to equal to 1 (normalized weighted average))

Referring now to FIG. 23, an overview of the operational flow of a process 2300 to compute light colors using sampled colors using a normalized weighted average technique, in accordance with various embodiments, is presented. Process 2300 is similar to the process illustrated schematically in FIGS. 17-22, as described above. It is noted that process 2300 is an example of the general process articulated by the pseudocode provided above, in accordance with various embodiments. Process 2300 may be performed by apparatus such as computing device 122 as shown in FIG. 1, in which an example mixed reality viewer 132 may be running, in accordance with various embodiments. Process 2300 may include blocks 2310 through 2370. In alternate embodiments, process 2300 may have more or less operations, and some of the operations may be performed in different order.

Process 2300 may begin at block 2310, where an example apparatus may receive a background image and a transform of a digital object relative to the background image in a mixed reality view. As described above, the transform may include values of position, rotation (orientation) and scale of the digital object as positioned by a user in a 3D space generated by an example mixed reality viewer, such as, for example, mixed reality viewer 132 of FIG. 1. In embodiments, the transform of the digital object may be determined by a tracker, such as, for example, tracker 150 of FIG. 1.

From block 2310, process 2300 may proceed to block 2320, where a set of pre-filtered versions of the background image at different resolutions may be generated. As described above this may, in embodiments, comprise a set of mipmaps. From block 2320 process 2300 may proceed to block 2330, where a 2D bounding box for the digital object may be computed in the screen space of the mixed reality viewer. For example, and as described above, this may be a two-step process. Initially a 3D bounding box for the digital object may be computed within a 3D space generated by the mixed reality viewer. From the 3D bounding box, a projection of a 2D bounding box that encompasses all of the borders of the 3D bounding box may then be generated in the screen space of the mixed reality viewer.

From block 2330, process 2300 may proceed to block 2340, where the 2D bounding box may be transformed to a closer fitting bounding region. For example, a rectangular 2D bounding box may be transformed to an inscribed ellipse, as described above. In alternate embodiments, where the shape of digital objects may better fit another bounding region, other shapes or types may be used. It is this transformed and closer-fitting bounding region that may be used, in embodiments, for sampling of the background image.

From block 2340, process 2300 may proceed to block 2350, where one of the set of pre-filtered versions of the background image may be selected for sampling. As noted above in connection with FIG. 22, a resolution of a background image may, for example, be chosen as a function of the size of the digital object so as to ensure there are a sufficient number of pixels along each dimension that are overlaid by the digital object, while at the same time choosing a lowest possible resolution.

From block 2350, process 2300 may proceed to block 2360, where a set of color samples of the selected version of the background image may be obtained, along a perimeter of the closer-fitting bounding region. For example, eight samples may be taken at equally distant points along an ellipse, as described above. Finally, from block 2360, process 2300 may proceed to block 2370, where a value for one or more digital lighting sources in the mixed reality view may be determined, based, at least in part, on the set of samples. For example, each of the one or more digital lighting sources may be a weighted combination of the set of color samples. In some embodiments, a weighting for each sample may be a function of its spatial proximity to the digital lighting source. For example, as described above with reference to FIGS. 11B and 11C, values for a right light and a left light may be determined from the set of eight samples, and the weightings of the eight samples for each light may be a function of distance of a given sample from the particular light.

Referring now to FIG. 24, an overview of the operational flow of a process 2400 to provide shadows for 3D digital objects, in accordance with various embodiments, is presented. Process 2400 is similar to the process expressed in the pseudocode provided above with reference to FIGS. 16A and 16B. Process 2400 may be performed by apparatus such as computing device 122 as shown in FIG. 1, in accordance with various embodiments. It is here noted, however, that a custom shader that may implement process 2400 may not need to sample or receive as inputs a background image onto which the 3D object is to be composited, as described above. Rather, process 2400 simply requires a virtual ground plane as an input. In embodiments, a shadow may be rendered using a virtual object in the shape of a plane, for example. The virtual plane may, for example, be rendered using a pixel shader, that may, for example, compute each pixel value of the plane as they would be seen form a user's point of view. Thus, in embodiments, the same computing device that renders a 3D object may be used to render a shadow, such as, for example, GPU 131, as shown in FIG. 1.

Continuing with reference to FIG. 24, process 2400 may include blocks 2410 through 2470. In alternate embodiments, process 2400 may have more or less operations, and some of the operations may be performed in different order. Process 2400 may begin at block 2410, where an example apparatus may receive or access a 3D object, a virtual ground plane, and a 3D rendering system. From block 2410, process 2400 may proceed to block 2420, where bounds of the 3D object may be computed. From block 2420, process 2400 may proceed to block 2330, where a virtual camera may be first placed outside the 3D object's bounds, below the virtual plane, and pointing upwards.

From block 2430, process 2400 may proceed to block 2440, where a depth component of the 3D object may be rendered from the virtual camera's point of view, and stored in memory, such as, for example, memory 128 of FIG. 1. From block 2440, process 2400 may proceed to block 2450, where a second virtual camera may be placed at a user's viewpoint, and, at from block 2450, process 2400 may proceed to block 2460, where the 3D object may be rendered from the viewpoint of the second virtual camera.

Finally, from block 2410, process 2400 may proceed to block 2320, where the ground plane may be rendered pointwise, using, for example, the custom shader algorithm provided above, with reference to FIGS. 16A and 16B.

Referring now to FIG. 25 wherein a block diagram of a computer device suitable for practicing the present disclosure, in accordance with various embodiments, is illustrated. As shown, computer device 2500 may include one or more processors 2502 and system memory 2504. Each processor 2502 may include one or more processor cores, and hardware accelerator 2575. An example of hardware accelerator 2505 may include, but is not limited to, programmed field programmable gate arrays (FPGA). In embodiments, processor 2502 may also include a memory controller (not shown). In embodiments, system memory 2504 may include any known volatile or non-volatile memory.

Additionally, computer device 2500 may include mass storage device(s) 2506 (such as solid state drives), input/output device interface 2508 (to interface with various input/output devices, such as, mouse, cursor control, display device (including touch sensitive screen), and so forth) and communication interfaces 2510 (such as network interface cards, modems and so forth). In embodiments, communication interfaces 2510 may support wired or wireless communication, including near field communication. The elements may be coupled to each other via system bus 2512, which may represent one or more buses. In the case of multiple buses, they may be bridged by one or more bus bridges (not shown).

Each of these elements may perform its conventional functions known in the art. In particular, system memory 2504 and mass storage device(s) 2506 may be employed to store a working copy and a permanent copy of the executable code of the programming instructions of an operating system, one or more applications, and/or various software implemented components of mixed reality viewer 132, mixed reality environment 134, digital lights 147, tracker 150, compositor 155, user interface 157, as described with reference to FIG. 1, collectively referred to as computing logic 2522. the programming instructions implementing computing logic 2522 may comprise assembler instructions supported by processor(s) 2502 or high-level languages, such as, for example, C, that can be compiled into such instructions. In embodiments, some of computing logic may be implemented in hardware accelerator 2575. In embodiments, part of computational logic 2522, e.g., a portion of the computational logic 2522 associated with the runtime environment of the compiler may be implemented in hardware accelerator 2575.

The permanent copy of the executable code of the programming instructions or the bit streams for configuring hardware accelerator 2575 may be placed into permanent mass storage device(s) 2506 and/or hardware accelerator 2575 in the factory, or in the field, through, for example, a distribution medium (not shown), such as a compact disc (CD), or through communication interface 2510 (from a distribution server (not shown)). While for ease of understanding, the compiler and the hardware accelerator that executes the generated code that incorporate the predicate computation teaching of the present disclosure to increase the pipelining and/or parallel execution of nested loops are shown as being located on the same computing device, in alternate embodiments, the compiler and the hardware accelerator may be located on different computing devices.

The number, capability and/or capacity of these elements 2510-2512 may vary, depending on the intended use of example computer device 2500, e.g., whether example computer device 2500 is a smartphone, tablet, ultrabook, a laptop, a server, a set-top box, a game console, a camera, and so forth. The constitutions of these elements 2510-2512 are otherwise known, and accordingly will not be further described.

FIG. 26 illustrates an example computer-readable storage medium having instructions configured to implement all (or portion of) software implementations of Mixed Reality Viewer 132, Mixed Reality Environment 134, Digital Lights 147, Tracker 150, Compositor 155, User Interface 157, as described above with reference to FIG. 1, and/or to practice (aspects of) the processes described in, or in connection with, FIGS. 7-24, earlier described, in accordance with various embodiments. As illustrated, computer-readable storage medium 2602 may include the executable code of a number of programming instructions or bit streams 2604. Executable code of programming instructions (or bit streams) 2604 may be configured to enable a device, e.g., computer device 2500, in response to execution of the executable code/programming instructions (or operation of an encoded hardware accelerator 2575), to perform (aspects of) the processes described in, or in connection with, FIGS. 7-24. In alternate embodiments, executable code/programming instructions/bit streams 2604 may be disposed on multiple non-transitory computer-readable storage medium 2602 instead. In embodiments, computer-readable storage medium 2602 may be non-transitory. In still other embodiments, executable code/programming instructions 2604 may be encoded in transitory computer readable medium, such as signals.

Referring back to FIG. 25, for one embodiment, at least one of processors 2502 may be packaged together with a computer-readable storage medium having some or all of computing logic 2522 (in lieu of storing in system memory 2504 and/or mass storage device 2506) configured to practice all or selected ones of the operations earlier described with reference to FIGS. 7-24. For one embodiment, at least one of processors 2502 may be packaged together with a computer-readable storage medium having some or all of computing logic 2522 to form a System in Package (SiP). For one embodiment, at least one of processors 2502 may be integrated on the same die with a computer-readable storage medium having some or all of computing logic 2522. For one embodiment, at least one of processors 2502 may be packaged together with a computer-readable storage medium having some or all of computing logic 2522 to form a System on Chip (SoC). For at least one embodiment, the SoC may be utilized in, e.g., but not limited to, a hybrid computing tablet/laptop.

It will be appreciated by persons of ordinary skill in the art that the present disclosure is not limited to what has been particularly shown and described hereinabove. Rather, the scope of the present disclosure includes both combinations and sub-combinations of the various features described hereinabove as well as modifications and variations which would occur to such skilled persons upon reading the foregoing description. Thus the disclosure is limited only by the appended claims.

The invention claimed is:

1. A system, comprising:
a memory device to store instructions and data; and
at least one processing device to execute the instructions stored in the memory device to:
receive a background image and a digital object to be composited onto the background image in a mixed reality view;
generate a 2D bounding region for the digital object;
select a version of the background image at a pre-defined resolution;
overlay the 2D bounding region on the selected version of the background image and obtain a set of samples of the colors of pixels of the selected version along a perimeter of the 2D bounding region; and
determine a value for one or more digital lighting sources to illuminate the digital object in the mixed reality view, based, at least in part, on the set of samples.

2. The system of claim 1, further comprising a camera or image sensor coupled to the processing device, and wherein the background image is a frame of video captured by the camera or image sensor in real time.

3. The system of claim 1, wherein the background image is stored in the memory prior to being loaded by the processing device.

4. The system of claim 1, wherein the at least one processing device executes the instructions stored in the memory device further to calculate an ambient light value.

5. The system of claim 4, wherein the at least one processing device executes the instructions stored in the memory device further to, at least one of:
tint light reflected onto the digital object, or
adjust intensity of light reflected onto the digital object, based, at least in part, on the ambient light value.

6. The system of claim 4, wherein the ambient light value is an average color of the set of samples.

7. The system of claim 1, wherein the at least one processing device executes the instructions stored in the memory device further to:
generate a set of versions of the background image at different resolutions.

8. The system of claim 1, wherein at least one of:
the selected version of the background image is based, at least in part, on the dimensions of the 2D bounding region.

9. The system of claim 1, wherein the at least one processing device executes the instructions stored in the memory device further to:
determine the value for the one or more digital lighting sources based, at least in part, on weighting the set of samples differently for each digital lighting source, and combining the weighted samples.

10. A method, comprising:
receiving a background image and a digital object to be composited onto the background image in a mixed reality view;
generating a 2D bounding region for the digital object;
selecting a version of the background image at a pre-defined resolution;
overlaying the 2D bounding region on the selected version of the background image and obtaining a set of samples of the colors of pixels of the selected version along a perimeter of the 2D bounding region; and
determining a value for one or more digital lighting sources to illuminate the digital object in the mixed reality view, based, at least in part, on the set of samples.

11. The method of claim 10, wherein the background image is one of:
a frame of video captured by a camera or image sensor coupled to the processing device in real time; or
stored in memory prior to being received by the processing device.

12. The method of claim 10, further comprising calculating, by the processing device, an ambient light value at the location of the digital object.

13. The method of claim 12, further comprising: tinting light reflected onto the digital object, or adjusting intensity of light reflected onto the digital object, based, at least in part, on the ambient light value.

14. The method of claim 12, wherein the ambient light value is an average color of the set of samples.

15. The method of claim 10, further comprising rendering, by the processing device, the digital object as illuminated by the digital lighting sources and displaying the digital object on a display device coupled to the processor.

16. The method of claim 15, further comprising rendering, by the processing device, the digital object with simulated shadows.

17. A computer-readable storage medium of a tangible article of manufacture comprising instructions that, when executed by one or more processing devices, causes the one or more processing devices to:
receive a background image and a digital object to be composited onto the background image in a mixed reality view;
generate a 2D bounding region for the digital object;
select a version of the background image at a pre-defined resolution;
overlay the 2D bounding region on the selected version of the background image and obtain a set of samples of the colors of pixels of the selected version along a perimeter of the 2D bounding region; and determine a value for one or more digital lighting sources to illuminate the digital object in the mixed reality view, based, at least in part, on the set of samples.

18. The computer-readable storage medium of claim 17, wherein execution of the instructions by the one or more processing devices, causes the one or more processing devices further to:

calculate an ambient light value, the ambient light value being an average color of the set of samples.

19. The computer-readable storage medium of claim 18, wherein execution of the instructions by the one or more processing devices, causes the one or more processing devices further to:

tint light reflected onto the digital object, or adjust intensity of light reflected onto the digital object, based, at least in part, on the ambient light value.

20. The computer-readable storage medium of claim 17, wherein execution of the instructions by the one or more processing devices, cause the one or more processing devices further to:

determine a value for the one or more digital lighting sources to illuminate the digital object in the mixed reality view, based, at least in part, on weighting the set of samples differently for each digital lighting source, and combining the weighted samples.

* * * * *